(12) United States Patent
Kalabic et al.

(10) Patent No.: US 11,548,520 B2
(45) Date of Patent: Jan. 10, 2023

(54) CONTROL OF AUTONOMOUS VEHICLES ADAPTIVE TO USER DRIVING PREFERENCES

(71) Applicant: Mitsubishi Electric Research Laboratories, Inc., Cambridge, MA (US)

(72) Inventors: Uros Kalabic, Jamaica Plain, MA (US); Ankush Chakrabarty, Cambridge, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 449 days.

(21) Appl. No.: 16/599,636

(22) Filed: Oct. 11, 2019

(65) Prior Publication Data

US 2021/0107500 A1    Apr. 15, 2021

(51) Int. Cl.
   *B60W 50/08*    (2020.01)
   *B60W 40/08*    (2012.01)
(52) U.S. Cl.
   CPC .......... *B60W 50/085* (2013.01); *B60W 40/08* (2013.01); *B60W 2520/105* (2013.01); *B60W 2520/125* (2013.01); *B60W 2720/106* (2013.01); *B60W 2720/125* (2013.01)
(58) Field of Classification Search
   None
   See application file for complete search history.

(56) References Cited

U.S. PATENT DOCUMENTS

| | | | |
|---|---|---|---|
| 2015/0321669 A1* | 11/2015 | Inou | B60W 30/14 701/70 |
| 2017/0021812 A1* | 1/2017 | Sugano | B60W 40/08 |
| 2017/0088128 A1* | 3/2017 | Nakada | B60W 30/12 |
| 2017/0267256 A1* | 9/2017 | Minster | B60W 50/082 |
| 2019/0023279 A1* | 1/2019 | Schacher | B60W 50/12 |
| 2019/0031191 A1* | 1/2019 | Satoh | B60W 30/12 |
| 2019/0225232 A1* | 7/2019 | Blau | B60W 50/0098 |

(Continued)

FOREIGN PATENT DOCUMENTS

WO    WO-2015104598 A1 *  7/2015  ......... B60W 40/107

*Primary Examiner* — Anne Marie Antonucci
*Assistant Examiner* — Amelia Vorce
(74) *Attorney, Agent, or Firm* — Gennadiy Vinokur; Hironori Tsukamoto

(57) ABSTRACT

A system for controlling an autonomous vehicle includes a memory configured to store parameters of a g-g plot defining admissible space of values of longitudinal and lateral accelerations. The g-g plot parameters define a mapping between user driving preferences and constrained control of the autonomous vehicle. The g-g plot parameters include a maximum forward acceleration, a maximum backward acceleration, a maximum lateral acceleration and a shape parameter defining profile of curves connecting maximum values of forward, backward, and lateral accelerations. The system accepts a comfort level as a feedback from a passenger of the vehicle, determines a dominant parameter corresponding to the feedback, updates the dominant parameter of the g-g plot based on the comfort level indicated in the feedback, and controls the vehicle to maintain dynamics of the vehicle within the admissible space defined by the parameters of the updated g-g plot.

13 Claims, 18 Drawing Sheets

(56) References Cited

U.S. PATENT DOCUMENTS

| | | | |
|---|---|---|---|
| 2020/0070811 A1* | 3/2020 | Yoshioka | B60W 30/045 |
| 2020/0070812 A1* | 3/2020 | Yoshioka | F02D 29/02 |
| 2020/0079396 A1* | 3/2020 | Beaurepaire | G06F 11/3013 |
| 2020/0225676 A1* | 7/2020 | Telpaz | B60W 40/09 |
| 2020/0324748 A1* | 10/2020 | Hiraga | B60T 8/321 |
| 2021/0362720 A1* | 11/2021 | Takahashi | B60W 30/18163 |

\* cited by examiner

CONTROL OF AUTONOMOUS VEHICLES ADAPTIVE TO USER DRIVING PREFERENCES

TECHNICAL FIELD

The invention relates generally to control of autonomous vehicles, and more particularly to control that adapts to user driving preferences.

BACKGROUND

Currently most computerized advanced driver assist or autonomous driving systems are designed to be deployed in the developed economy markets, such as the American, European or Japanese markets, where there are long histories of wide spread use of private motor vehicles and associated large population of experienced drivers, as well as strictly enforced codified traffic laws. These systems tend to mimic an idealized rule, following a risk averse driving style. The autonomous driving systems typically do not provide a sense of customization particular to the owner, and give the vehicles more of a generic feel—like a taxi instead of your own car. See, e.g., US US20150158486A1.

An autonomous vehicle can carry one or more passengers from one destination to another. Different passengers may have different requirements of an autonomous vehicle or preferences regarding the operation of the autonomous vehicle. Therefore, a uniform style of autonomous driving system may not be desirable for some users.

Accordingly, there is a need to provide a method for controlling autonomous vehicles adaptively based on user preferences.

SUMMARY

It is an object of some embodiments to provide a system and a method for control of autonomous vehicles in a manner adaptive to driving preferences of one or multiple passengers of the vehicle. Additionally or alternatively, it is an object of some embodiment to extract driving preferences without the need of passengers to drive a vehicle and to map the driving preferences of the passengers into quantities suitable for autonomous control modules.

When in autonomous operation, a vehicle's occupants, including those who occupy the driver's seat, are by definition passengers. In ordinary design, vehicle designers are usually concerned with modifying the handling and drive quality to satisfy the driver. During regular driving, the driving parameters can be learned during the actual driving by evaluating the driver's control inputs. However, in autonomous operation, the vehicle's occupants, including those who occupy the driver's seat, if any, are by definition passengers. To that end, instead of learning driving parameters, in case of autonomous driving, these parameters need to be received from an occupant of the autonomous vehicle. In addition, instead of learning the driving preference of an active driver, some embodiments learn a comfort preference of a passive occupant.

Some embodiments are based on realization that the passenger comfort can be represented by a g-g plot which is a plot of longitudinal vs. lateral acceleration experienced by a vehicle occupant, and that the g-g plot can be used as a performance constraint to be enforced by the vehicle controller. This realization is based on the recognition that different parameters of a g-g plot represent different styles and/or different experiences of a driver ranging from a novice driver to an experienced one. Therefore, these parameters are sufficient to specify different comfort levels of different drivers. In addition, the g-g plot provides clear constraints that can be used for vehicle control. In such a manner, the g-g plot can serve as a mapping between the comfort of an occupant of a vehicle and constraints on the vehicle's control parameters.

Furthermore, some embodiments are based on the recognition that four different parameters form a g-g plot. These parameters include the maximum magnitude of the forward acceleration, the maximum magnitude of the backward acceleration, i.e. braking, the maximum magnitude of the lateral acceleration, and the shape of the g-g plot defining a constraint on the mix of the lateral and longitudinal accelerations. Some embodiments are based on the recognition that when passengers indicate their comfort or discomfort level, it is impractical for the passenger to identify the source of their comfort and/or discomfort. However, the source of their feeling can be relative to one or more parameters of a g-g plot and needs to be identified in order to update the g-g plot.

To that end, different embodiments identify dominant factors causing a comfort feedback from a passenger. Different embodiments use active and passive approaches in identifying the dominant comfort factor. During the passive approach, some embodiments determine a dominant factor based on the proximity of a parameter of the g-g plot to its maximum value. During the active approach, some embodiments deliberately drive the vehicle with one factor being dominant and request feedback from the passenger.

For example, one embodiment using a passive approach, in response to receiving a comfort feedback from a passenger, checks the logs of the vehicle to estimate the latest parameter approaching its maximum value at a time preceding the feedback. For example, if the acceleration is the closest to its maximum value, then the acceleration is the dominant factor, and the embodiment updates the constraint on acceleration based on the feedback. If the deceleration is the closest to its maximum value, the deceleration is the dominant factor. If lateral acceleration is the closest to its maximum value, then lateral acceleration is the dominant factor. However, if neither forward/backward acceleration nor lateral acceleration are within a predetermined distance to their maximum values, the dominant factor is the shape of the g-g plot.

During an active approach, some embodiments drive a vehicle in a manner to make one of the four factors of the g-g plot dominant over the other factors. For example, to learn the maximum forward acceleration, the autonomous vehicle, in the course of ordinary driving, accelerates slightly past the limits of the maximum acceleration. Then the system asks a designated passenger, typically the one seated in the driver's seat, for feedback. If the passenger responds positively, then the maneuver is judged to be appropriate and the maximum acceleration is modified upwards. If the passenger responds negatively, then the maneuver is judged to be inappropriate and the maximum acceleration is modified downwards. With slight modification to allow exploration of the search space, this leads to the determination of the passenger's maximum acceleration preference.

The embodiment can learn the other three parameters in a similar manner by performing different maneuvers making different parameters dominant to learn each parameter. To learn maximum braking, some embodiments perform a straight-road braking maneuver. To learn maximum lateral acceleration, some embodiments control the vehicle to go through tight curves at constant speed. To learn the p parameter, some embodiments control the vehicle to go through a curve with lateral and longitudinal acceleration profiles that track the edge of the g-g plot.

Accordingly, one embodiment discloses a system for controlling an autonomous vehicle. The system includes a memory configured to store parameters of a g-g plot defining admissible space of values of longitudinal and lateral accelerations, the g-g plot parameters include a maximum forward acceleration, a maximum backward acceleration, a maximum lateral acceleration and a shape parameter defining profile of curves connecting maximum values of forward, backward, and lateral accelerations; an input interface configured to accept a comfort level as a feedback from a passenger of the vehicle; a processor configured to determine a dominant parameter corresponding to the feedback and to update the dominant parameter of the g-g plot based on the comfort level indicated in the feedback; and a controller configured to control the vehicle to maintain dynamics of the vehicle within the admissible space defined by the parameters of the updated g-g plot.

Another embodiment discloses a method for controlling an autonomous vehicle, wherein the method uses a processor coupled with stored instructions implementing the method, wherein the instructions, when executed by the processor carry out at steps of the method, including accepting a comfort level as a feedback from a passenger of the vehicle; determining a dominant parameter of a g-g plot corresponding to the feedback, wherein the g-g plot defines admissible space of values of longitudinal and lateral accelerations, the g-g plot parameters include a maximum forward acceleration, a maximum backward acceleration, a maximum lateral acceleration and a shape parameter defining profile of curves connecting maximum values of forward, backward, and lateral accelerations; updating the dominant parameter of the g-g plot based on the comfort level indicated in the feedback; and controlling the vehicle to maintain dynamics of the vehicle within the admissible space defined by the parameters of the updated g-g plot.

Yet another embodiment discloses a non-transitory computer readable storage medium embodied thereon a program executable by a processor for performing a method, the method includes accepting a comfort level as a feedback from a passenger of the vehicle; determining a dominant parameter of a g-g plot corresponding to the feedback, wherein the g-g plot defines admissible space of values of longitudinal and lateral accelerations, the g-g plot parameters include a maximum forward acceleration, a maximum backward acceleration, a maximum lateral acceleration and a shape parameter defining profile of curves connecting maximum values of forward, backward, and lateral accelerations; updating the dominant parameter of the g-g plot based on the comfort level indicated in the feedback; and controlling the vehicle to maintain dynamics of the vehicle within the admissible space defined by the parameters of the updated g-g plot.

DETAILED DESCRIPTION

Figure 1A:
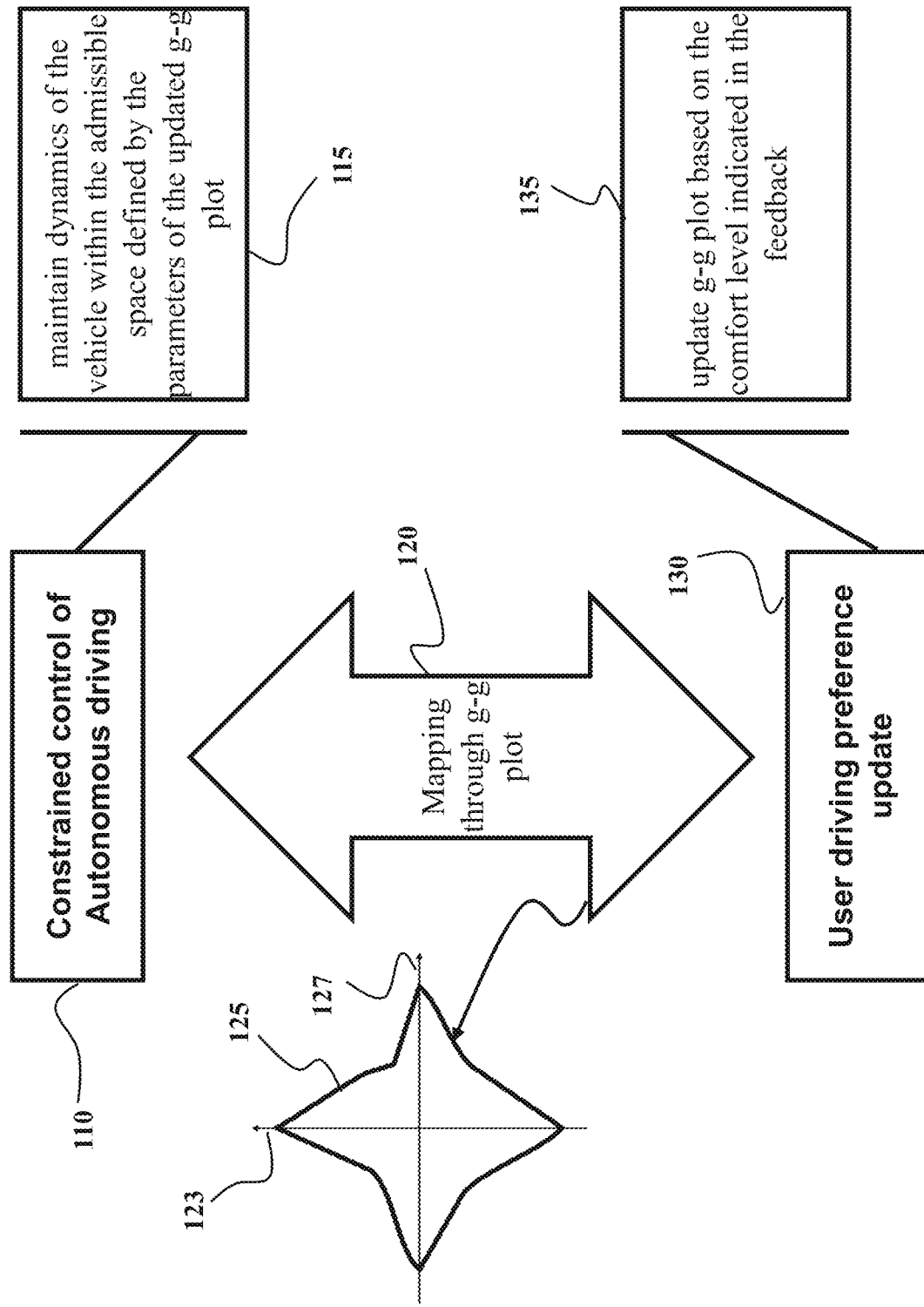
FIGS. 1A and 1B show schematic of some principles used by some embodiments to transform driving preferences of the passengers of an autonomous vehicle into driving constraints understandable for an autonomous driving controller.
Figure 1B:
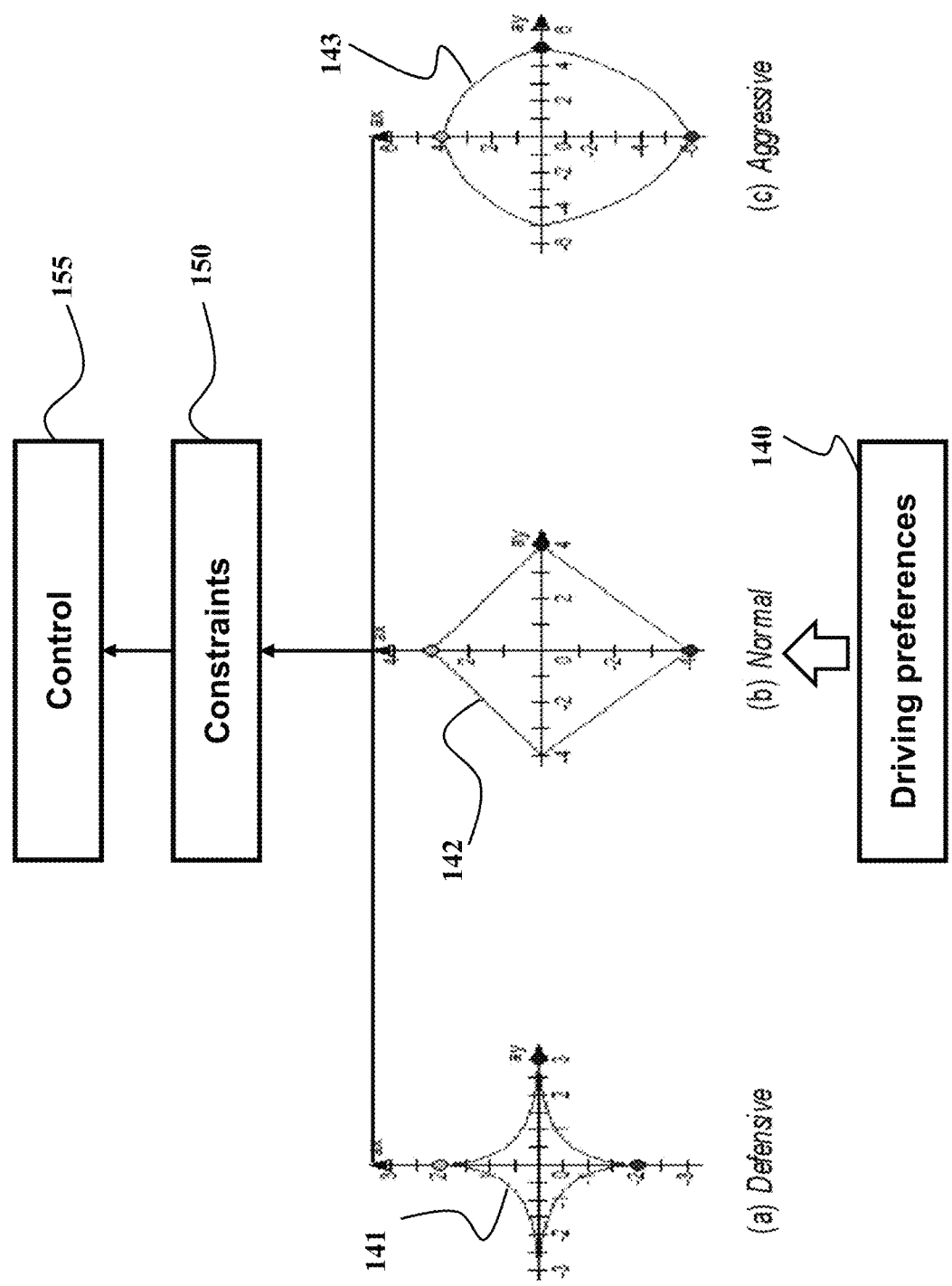

FIGS. 1A and 1B show schematics of some principles used by some embodiments to transform driving preferences of the passengers of an autonomous vehicle into driving constraints understandable for an autonomous driving controller. When in autonomous operation, a vehicle's occupants, including those who occupy the driver's seat, are by definition passengers. In ordinary design, vehicle designers are usually concerned with modifying the handling and drive quality to satisfy the driver. During regular driving, the driving parameters can be learned during the actual driving by evaluating driver's control inputs. However, in autonomous operation, vehicle's occupants, including those who occupy the driver's seat, if any, are by definition passengers. To that end, instead of learning driving parameters, in case of autonomous driving, these parameters need to be received from an occupant of the autonomous vehicle. In addition, instead of learning the driving preference of an active driver, some embodiments learn a comfort preference of a passive occupant.

However, the passengers' feedbacks, like I am or I am not comfortable, are not the instruction that driving controllers can unambiguously understand. When a passenger indicates her discomfort, the cause of the discomfort is not immediately clear. For example, the discomfort can be caused by a high vehicle speed, uncomfortable level of deceleration, and/or can be caused by a sharp turn. In addition, even if the reason of discomfort is identified, there is a need for a means to transform the discomfort into the control instruction. Because there could be many different reasons for driving discomfort, the instruction should consider more than one reason. In other words, there is a need for a mapping between driving preferences of passengers of autonomous vehicle and a controller of that vehicle.

FIG. 1A shows a schematic of a mapping 120 between driving preferences of passengers of autonomous vehicle and a controller of that vehicle used by some embodiments. The embodiments are based on the realization that the passenger comfort can be represented by a g-g plot 125 which is a plot of longitudinal acceleration 123 vs. lateral acceleration 127 experienced by a vehicle occupant. At the same time, the g-g plot 125 can be used as a performance constraint to be enforced by the vehicle controller.

This realization is based on the recognition that different parameters of a g-g plot represent different styles and/or different experiences of a driver ranging from a novice driver to an experienced one. Therefore, these parameters are sufficient to specify different comfort levels of different drivers. In addition, the g-g plot provides clear constraints that can be used for vehicle control. In such a manner, the comfort of g-g plot can serve as a mapping 120 between the comfort of an occupant of a vehicle and constraints on the vehicle's control parameters.

FIG. 1B shows a schematic of mapping of different driving preferences to the control according to some embodiments. For example, a g-g plot can characterize the driving profile of an unskilled driver, an ordinary driver, and a skilled driver. An unskilled driver exhibits the driving profile represented by a g-g plot 141. In the profile represented by a g-g plot 141, high levels of longitudinal accelerations are accompanied by at most relatively little lateral acceleration and high levels of lateral acceleration are accompanied by at most relatively little longitudinal acceleration. The unskilled drivers have trouble mixing lateral and longitudinal accelerations and can adopt a defensive driving style. A skilled driver can adopt more aggressive driving style and her g-g plot can exhibit the driving profile 143 that specifies high levels of longitudinal accelerations accompanied by relatively high lateral acceleration as well as high levels of lateral acceleration accompanied by relatively high longitudinal acceleration. In other words, the skilled drivers are skilled at mixing longitudinal and lateral accelerations. The g-g plot 142 represents an average driving style of normal day-to-day driving.

A g-g plot can be characterized mathematically using the following inequality:

$$\begin{cases} \left(\frac{a_{lon}}{a}\right)^p + \left(\frac{a_{lat}}{c}\right)^p \leq 1 & a_{lon} \geq 0 \\ \left(\frac{a_{lon}}{b}\right)^p + \left(\frac{a_{lat}}{c}\right)^p \leq 1 & a_{lon} < 0 \end{cases}$$

Therefore the g-g plot is characterized by four parameters: a is the maximum magnitude of the forward acceleration, b is the maximum magnitude of the backward acceleration, i.e. braking, c is the maximum magnitude of the lateral acceleration, and p determines the shape of the g-g plot. p between 0 and approximately 1 corresponds to more unskilled drivers, p between approximately 1 and 2 corresponds to more skilled drivers, and p around approximately corresponds to an ordinary driver.

Accordingly, by updating 130 the profile of g-g plot 123 it is possible to capture the driving preferences 140. For example, some embodiments update 135 g-g plot based on the comfort level indicated in the feedback. In addition, because the g-g plot can be mathematically represented by its parameters, the g-g plot defines constraints 150 that can be used to control 155 the vehicle. To that end, some embodiments provide constrained control 110 of autonomous vehicle that maintains 115 dynamics of the vehicle within the admissible space defined by the parameters of the updated g-g plot. In such a manner, the user driving preferences indicated in her feedback is transformed to constraints of the constrained control of autonomous driving.

Figure 2A:
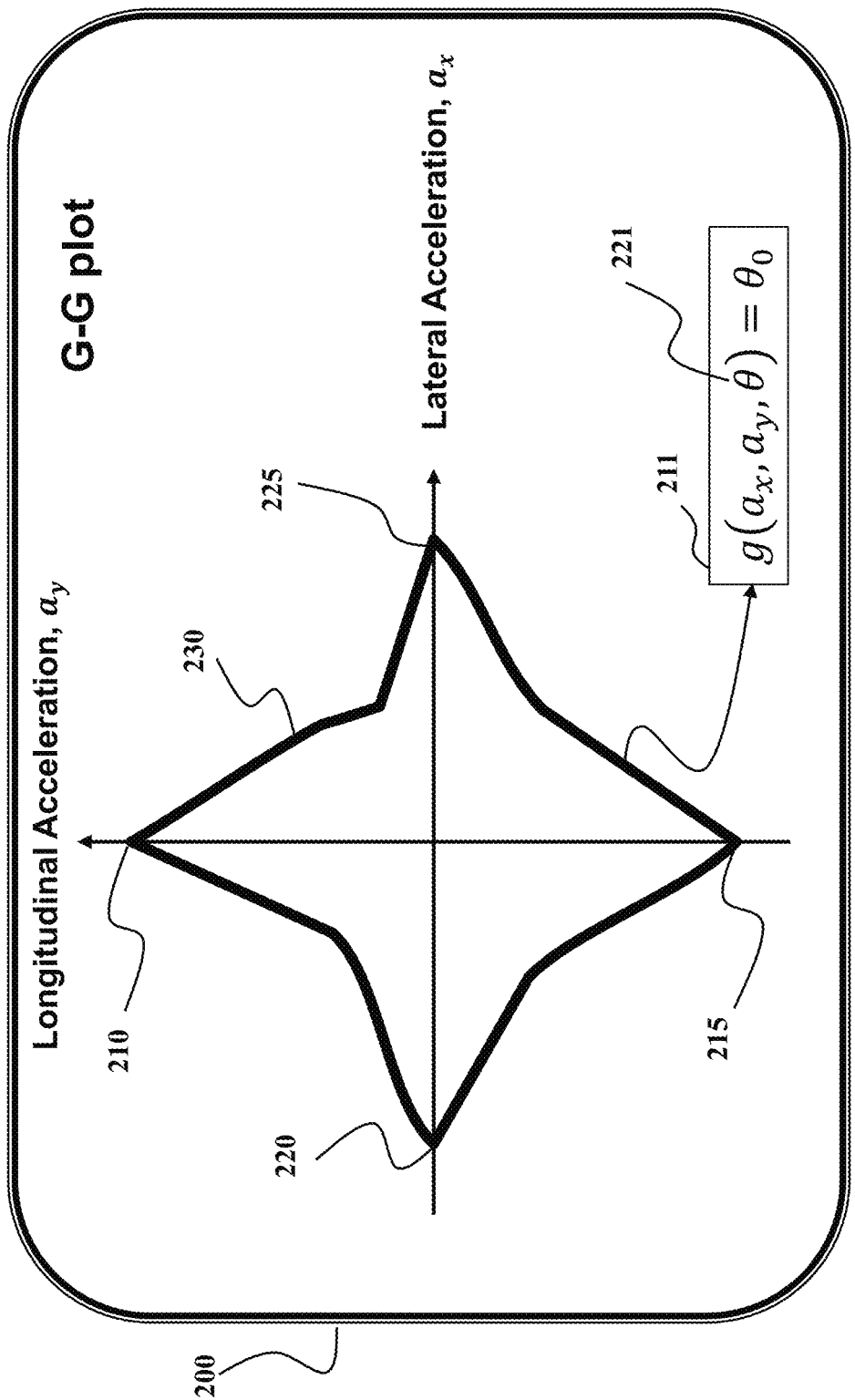
FIG. 2A shows a schematic of a g-g plot used by some embodiments.

FIG. 2A shows a schematic of a g-g plot used by some embodiments. The embodiments are based on the realization that a driver-as-passenger's comfort preference is linked to the coupling between longitudinal acceleration and lateral acceleration that she feels while riding in a vehicle. This coupling is described by the g-g plot curve 200 which has a parametric form 211. The g-g plot is typically represented by some parameters 221, where this set of parameters is related with the comfort preference of the driver-as-passenger.

One embodiment of the g-g plot curve is given by $$\begin{cases} \left|\frac{a_x}{a_{max}}\right|^p + \left|\frac{a_y}{c_{max}}\right|^p \leq 1, & \text{if } a_x \geq 0 \\ \left|\frac{a_x}{b_{max}}\right|^p + \left|\frac{a_y}{c_{max}}\right|^p \leq 1, & \text{if } a_x < 0 \end{cases}$$

where $a_x$ and $a_y$ are the longitudinal and lateral accelerations felt by the passenger, and the parameters $\theta := \{a_{max}, b_{max}, c_{max}, p\}$ are the maximum magnitudes of positive longitudinal acceleration, negative longitudinal deceleration, lateral acceleration, and $p \in (0,2]$ is a parameter relating longitudinal and lateral accelerations, respectively.

To that end, four different parameters form a g-g plot. These parameters include the maximum magnitude of the forward acceleration 210, the maximum magnitude of the backward acceleration, i.e. braking 215, the maximum magnitude of the lateral acceleration 220 and 225, and the shape of the g-g plot 230 defining a constraint on the mix of the lateral and longitudinal accelerations. Some embodiments are based on the recognition that when passengers indicate their comfort or discomfort level, it is impractical for the passenger to identify the source of their comfort and/or discomfort. However, the source of her feeling can be relative to one or more parameters of a g-g plot and needs to be identified in order to update the g-g plot. To that end, different embodiments identify dominant factors causing a comfort feedback from a passenger.

Figure 2B:
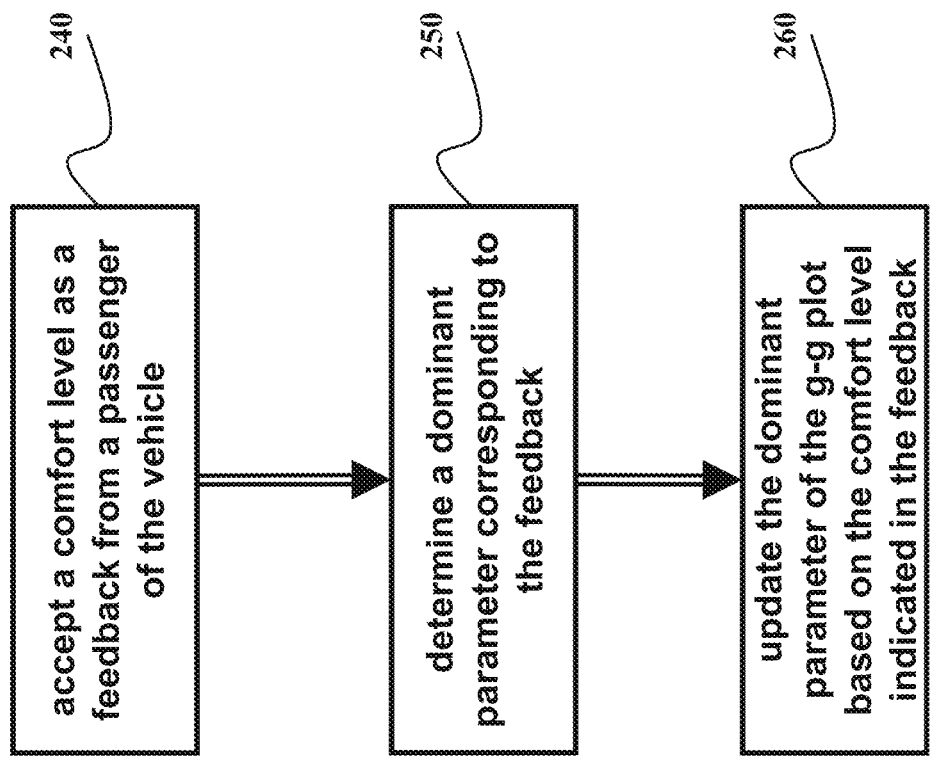
FIG. 2B show a flow chart of a method for updating a g-g plot based on a dominant factor of driving according to one embodiment.

FIG. 2B shows a flow chart of a method for updating a g-g plot based on a dominant factor of driving according to one embodiment. The embodiment accepts 240 a comfort level as a feedback from a passenger of the vehicle. The comfort level can be received through a number of different kinds of input interfaces described below. The embodiment determines 250 a dominant parameter corresponding to the feedback and updates 260 the dominant parameter of the g-g plot based on the comfort level indicated in the feedback. The instructions of steps 250 and 260 can be performed using a processor connected to the input interface and a memory storing current parameters of a g-g plot.

In some implementations, a dominant parameter is one of the four parameters of the g-g plot. Different embodiments use active and passive approaches in identifying the dominant comfort factor. During the passive approach, some embodiments determine a dominant factor based on the proximity of a parameter of the g-g plot to its maximum value. During the active approach, some embodiments deliberately drive the vehicle with one factor being dominant and request feedback from the passenger.

Figure 3:
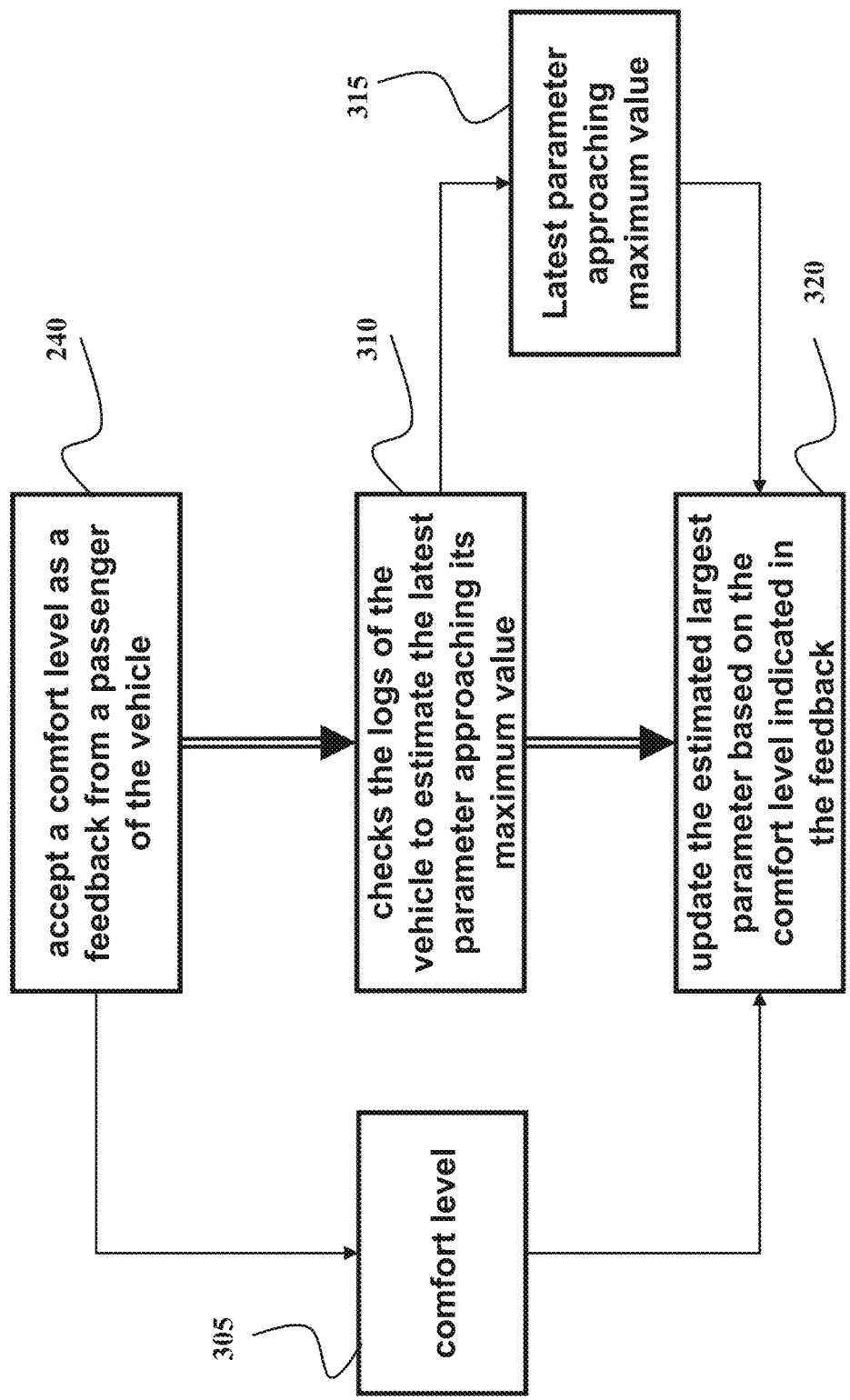
FIG. 3 shows a block diagram of a method for selecting and updating a dominant parameter of g-g plot using a passive approach according to one embodiment.

FIG. 3 shows a block diagram of a method for selecting and updating a dominant parameter of g-g plot using a passive approach according to one embodiment. The embodiment, in response to receiving a comfort feedback 305 from a passenger, checks 310 the logs of the vehicle to estimate the latest parameter 315 approaching its maximum value at a time preceding the feedback. For example, if the acceleration is the closest to its maximum value, then the acceleration is the dominant factor, and the embodiment updates the constraint on acceleration based on the feedback. If the deceleration is the closest to its maximum value, the deceleration is the dominant factor. If lateral acceleration is the closest to its maximum value, then lateral acceleration is the dominant factor. However, if neither forward/backward acceleration nor lateral acceleration is within a predetermined distance to their maximum values than the largest parameter and the dominant factor is the shape of the g-g plot. The predetermined distance can be selected by a system designer. Next, the embodiment updates 320 the estimated largest parameter based on the comfort level 245 indicated in the feedback.

During an active approach, some embodiments drive a vehicle in a manner to make one of the four factors of the g-g plot dominant over the other factors. For example, to learn the maximum forward acceleration, the autonomous vehicle, in the course of ordinary driving, accelerates slightly past the limits of the maximum acceleration. Then the system asks a designated passenger, typically that seated in the driver's seat, for feedback. If the passenger responds positively, then the maneuver is judged to be appropriate and the maximum acceleration is modified upwards. If the passenger responds negatively, then the maneuver is judged to be inappropriate and the maximum acceleration is modified downwards. With slight modification to allow exploration of the search space, this leads to the determination of the passenger's maximum acceleration preference.

Figure 4:
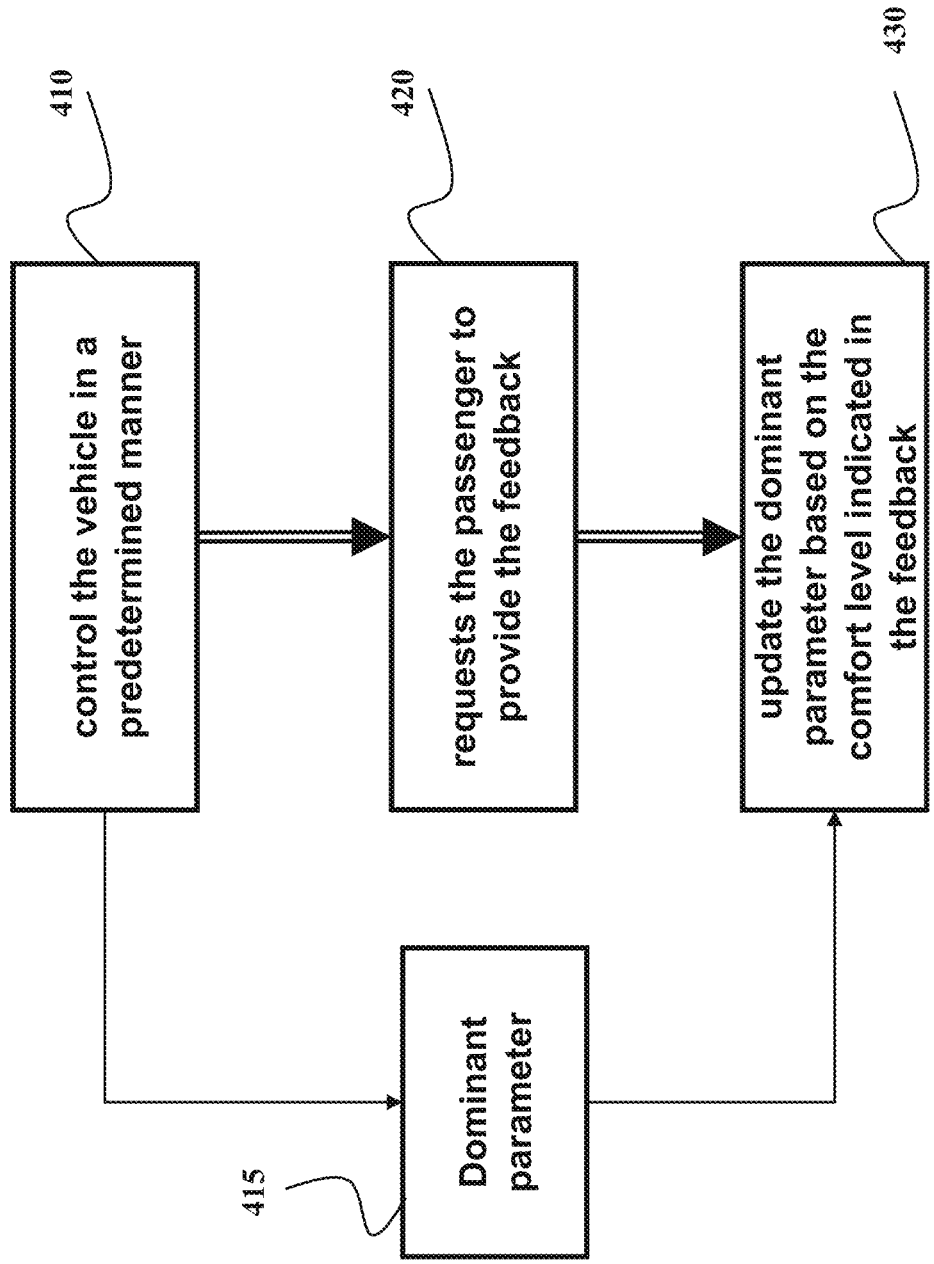
FIG. 4 shows a block diagram of a method for selecting and updating a dominant parameter of g-g plot using an active approach according to one embodiment.

FIG. 4 shows a block diagram of a method for selecting and updating a dominant parameter of g-g plot using an active approach according to one embodiment. The embodiment request 410 the controller of the vehicle to control the vehicle to move in a predetermined manner to make one of the g-g plot parameters dominant 415. Next, the embodiment requests 420 the passenger to provide the feedback on the movement of the vehicle in the predetermined manner, and updates 430 the dominant parameter 415 associated with the movement in the predetermined manner based on the feedback.

For example, when the embodiment requests the controller to move the vehicle straight with a value of the forward acceleration above the maximum forward acceleration then the forward acceleration is the dominant parameter. When the embodiment requests the controller to move the vehicle straight with a value of the backward acceleration above the maximum backward acceleration then the backward acceleration is the dominant parameter. When the embodiment requests the controller to move through a curve with a value of the lateral acceleration above the maximum lateral acceleration then the lateral acceleration the dominant parameter. When the embodiment requests the controller to move through the curve with a value of the lateral acceleration and a value of forward acceleration tracking a profile of the g-g plot then the lateral acceleration the dominant parameter.

Figure 5A:
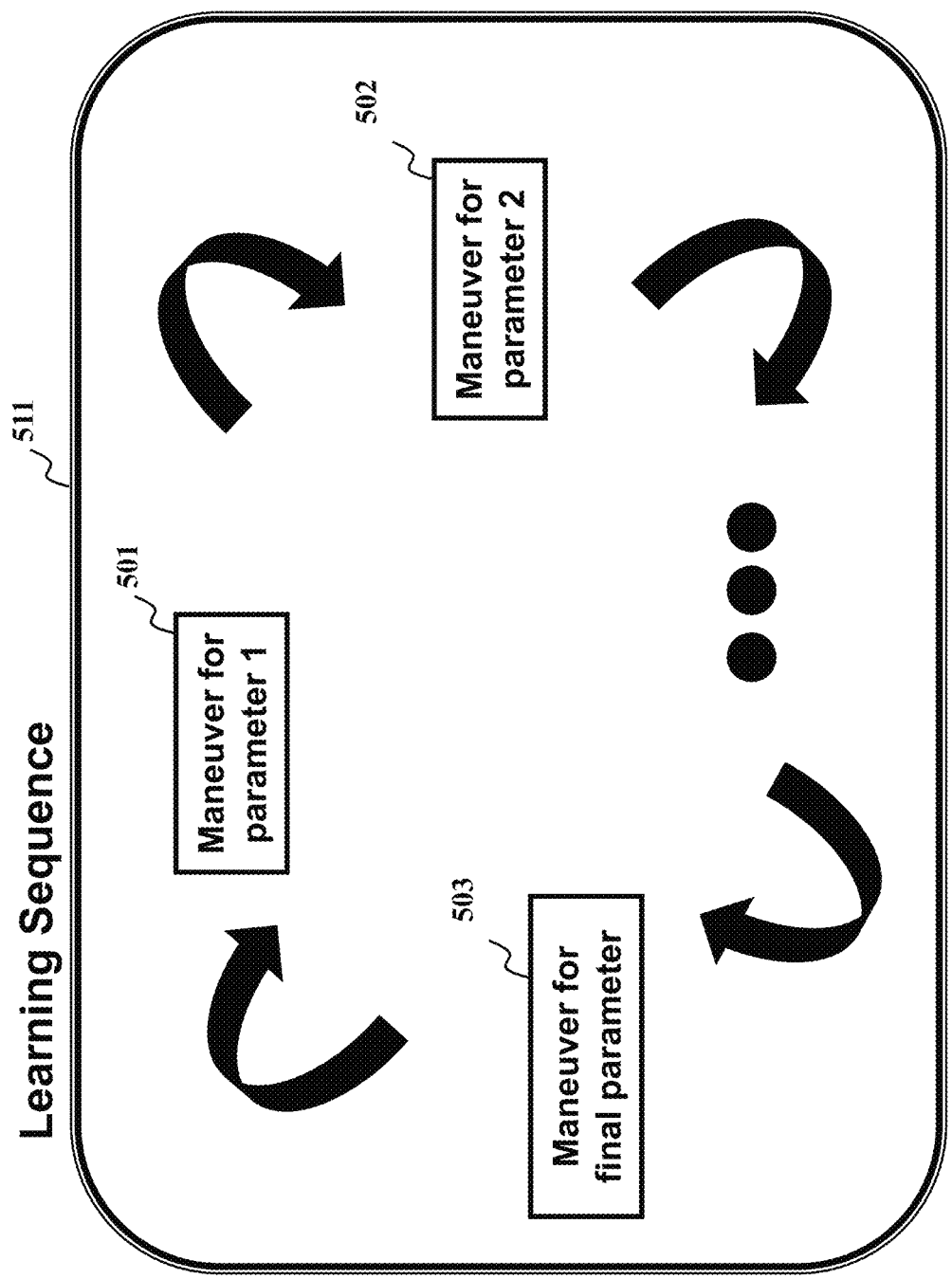
FIG. 5A shows a schematic of a sequence of maneuvers for identifying a dominant parameters 415 using active approach according to some embodiments.

FIG. 5A shows a schematic of a sequence of maneuvers 511 for identifying a dominant parameters 415 using an active approach according to some embodiments. The maneuvers are iterative, so a maneuver is designed and targeted to making a specific parameter of the parameters of the g-g plot dominant. For example, a maneuver 501 is designed to yield data about the comfort level of the first parameter of θ, a maneuver 502 is designed to yield data about the comfort level of the second parameter of θ, and so on, till 503 for the final parameter of θ. In one embodiment of this iterative procedure to learn the parameters is to identify on-line, a passenger's internal comfort region based on the curve 125, that is, her personalized parameters $a_{max}$, $b_{max}$, $c_{max}$ and p.

Figure 5B:
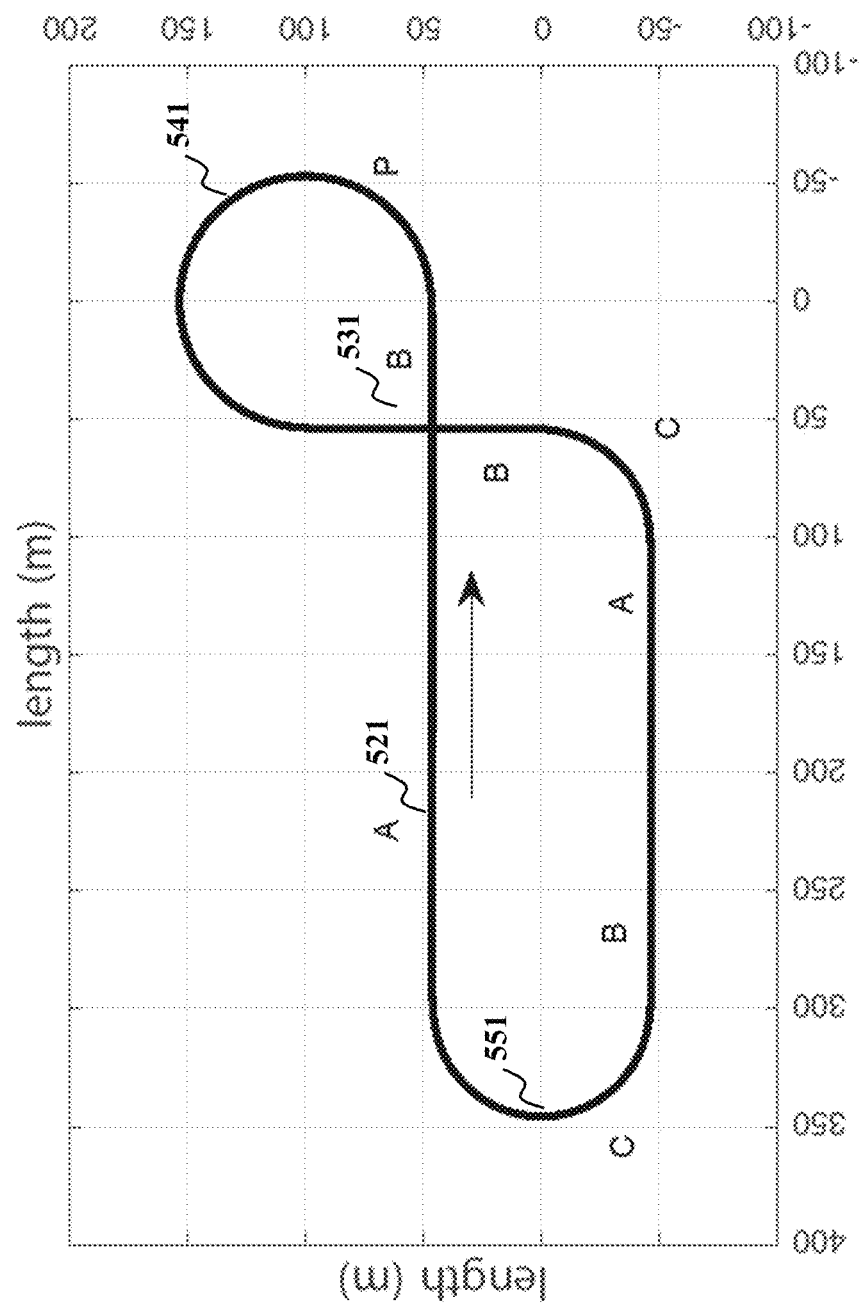
FIG. 5B shows a schematic of an exemplar track on which the vehicle can drive autonomously in order to collect data according to one embodiment.

FIG. 5B shows a schematic of an exemplar track on which the vehicle can drive autonomously in order to collect data according to one embodiment. The track is labeled by type of maneuver being tested. There are four maneuvers: A 521, B 531, C 541, and P 551, which yield information about $a_{max}$, $b_{max}$, $c_{max}$ and p, respectively. In all maneuvers, the maneuvers involve varying some vehicle related quantity such as the desired velocity along the track, according to a procedure designed to reach the expected limits of driver-as-passenger comfort.

One embodiment is of the maneuvers that are designed to test a passenger's acceleration and deceleration limits is described herein. These are performed on the three straight segments of the track. During Maneuver A 521, the vehicle speeds up at the maximum allowable acceleration $a_{max}$. During Maneuver B 531, the vehicle slows down at the maximum allowable deceleration $b_{max}$. This is accomplished by varying the desired velocity so that, if the vehicle tracks the velocity perfectly, the required acceleration or deceleration will be achieved. To determine the desired velocity, one assumes that there is an initial velocity $v_i$ near the beginning of the straight segment and a final, exit velocity $v_f$ near the end. Given a passenger's maximum acceleration $a_{max}$, some embodiments compute the velocity profile that adheres to a constant acceleration set at $a_{max}$ in terms of length along the road segment $s-s_0$. This velocity profile is given by, $$v_{d,+}(s) = \sqrt{v_i^2 + 2a_{max}(s-s_0)}.$$

Similarly, given a passenger's maximum deceleration $b_{max}$, some embodiments compute the velocity profile that adheres to a constant deceleration set at $b_{max}$ in terms of length away from the end of the road segment $s_f-s$. This velocity profile is given by, $$v_{d,-}(s) = \sqrt{v_f^2 + 2b_{max}(s_f-s)}.$$

In general, the initial velocity $v_i$ is set to the desired velocity at which the vehicle exits the curve preceding the straight-line segment; the final velocity $v_f$ is set to the desired velocity at which the vehicle enters the next curve. To ensure consistency between the three choices of velocity, some embodiments take the minimum of the three when traveling along the straight segment, i.e., the longitudinal velocity is set to the minimum of the maximum velocity and the velocities computed by (3), that is, $$v_{d,x}(s) = \min\{v_{d,+}(s), v_{d,-}(s), v_{max}\}.$$

In one embodiment of testing the lateral acceleration, the vehicle moves through curves at a constant velocity. Curved segments of the track can be approximated as circular arcs, meaning that the acceleration on the vehicle is close to constant. Using the expression for centripetal acceleration, the desired speed is set to $v_{d,x} = \sqrt{r_1 c_{max}}$, where $r_1$ is the radius of curvature of the turn during both segments.

One embodiment that tests a passenger's preferred relationship between longitudinal and lateral acceleration sets the desired velocity so that the curve on the g-g plot follows the periphery of the curve 125. To solve for the required velocity, we begin by assuming that $a_x = \dot{v}_{d,x}$ and $a_y = v_{d,x}^2/r_2$, where $r_2$ is the radius of curvature of the turn. In this example, the turn is left-handed, and we obtain the differential equation, $$\left(\frac{\dot{v}_{d,x}}{a_{max}}\right)^p + \left(\frac{v_{d,x}^2}{r_2 c_{max}}\right)^p = 1$$

which can be solved with a change of variables for multiple values of $p = \{0.2, 0.4, \ldots, 2.0\}$.

Figure 6:
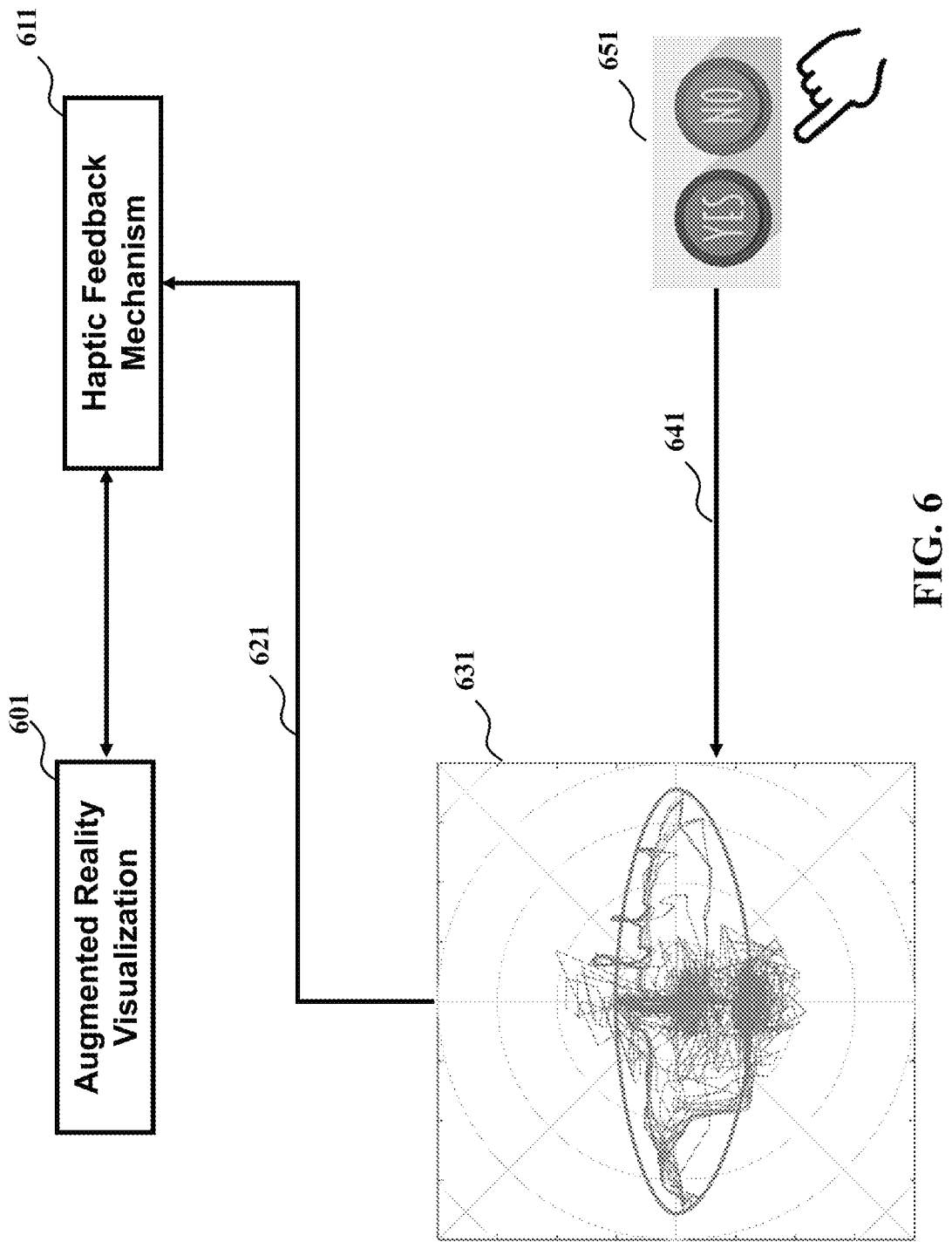
FIG. 6 shows a block diagram of a method for using a virtual reality to determine g-g plot specifying user preferences according to one embodiment.

FIG. 6 shows a block diagram of a method for using a virtual reality to determine g-g plot specifying user preferences according to one embodiment. For example, this method can be used to avoid actual driving that makes different parameters of g-g plot dominant and/or can be used for warm-starting with a good initial guess of the passenger comfort preferences so that the parameters converge quickly during training and the training phase is shortened. This method involves using augmented or virtual reality 601 wherein the human user receives visual and haptic feedback 611 from a simulated vehicle-driving environment. The procedure for learning described above can be used here without explicitly operating the vehicle. Based on responses to questions 651 asked in the simulated environment, the labels are transmitted 641 to the g-g plot 631, which is fed back into the controller of the simulated vehicle 621. In this way, a coarse understanding of the user's comfort preferences can be obtained. Some embodiments of the augmented reality is by use of a motion simulator chair, gaining chair, etc., and a driving simulator software from which vehicle-related motions or signals such as jerks, torques, roll, pitch, heave, engine rev sounds, etc., can be obtained.

Figure 7:
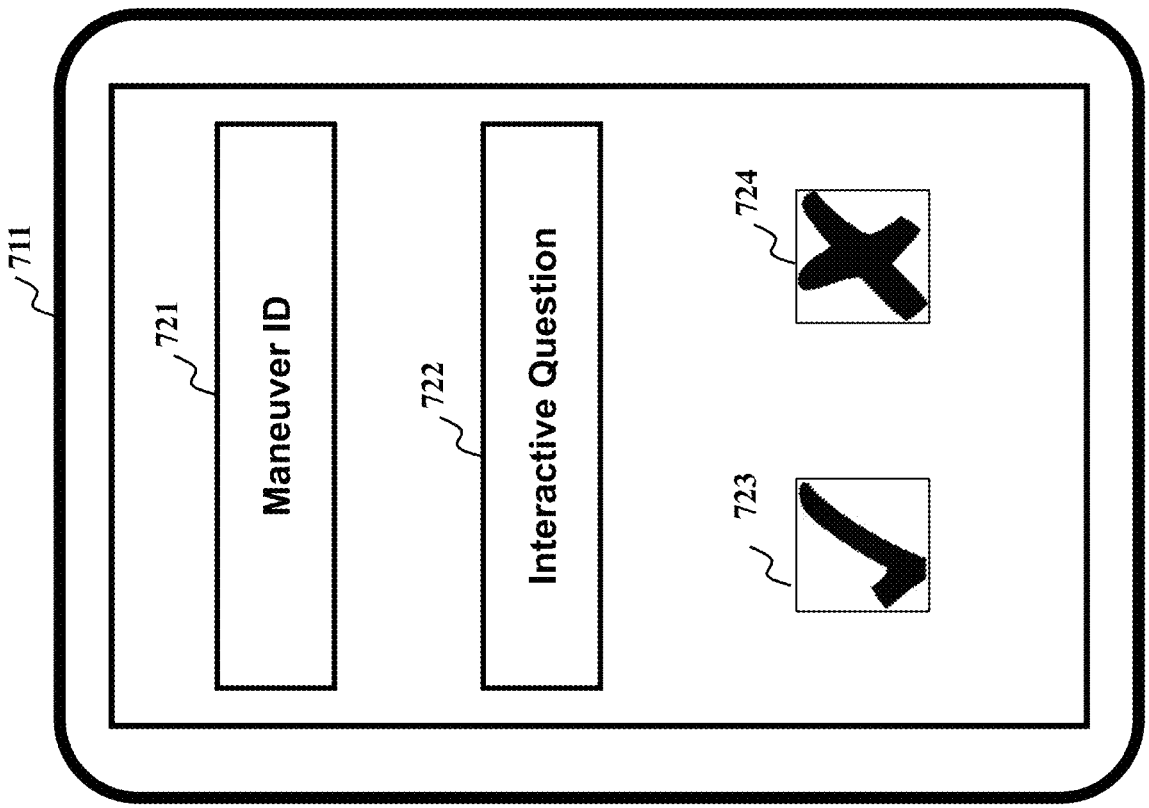
FIG. 7 shows a schematic of a process of receiving labels for learning the comfort levels of the passenger.
Figure 7:
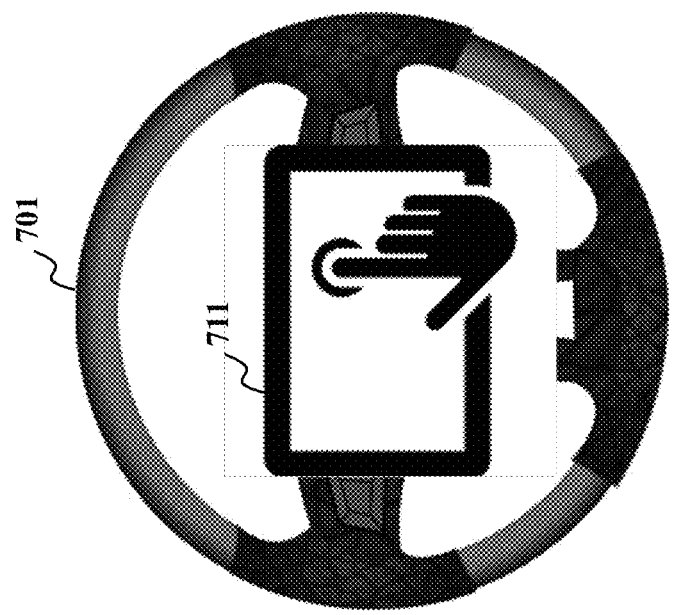

FIG. 7 shows a schematic of a process of receiving labels for learning the comfort levels of the passenger. Each human user is shown via an interactive system for example, a display 711 on the steering wheel 701, or other such configurations, the maneuver ID 721 showing which parameter is being updated for the current maneuver, and faces an interactive question 722 that demands a sequence of responses, for example, yes 723 or no 724. The parameters are learned on-line accordingly.

Some embodiments of this procedure are described herein. The learning procedure is the same for Maneuvers A, B, and C. Without loss of generality, let $y^k$ represent one of $a_{max}$, $b_{max}$, $c_{max}$ in iteration k. During the corresponding maneuver, an update is made to the corresponding parameter based on the human label "yes" 723 or "no" 624 received. An example of such an update is $$y^{k+1} = \begin{cases} \min(y^k + \Delta y^k, y_{max}^k) & \text{if "yes"}, \\ \max(y^k - \Delta y^k, y_{min}^k) & \text{if "no"}, \\ y^k & \text{otherwise} \end{cases}.$$

The variables $y_{min}^k$ and $y_{max}^k$ are the minimum and maximum values corresponding to the appropriate maneuver. The variable $\Delta y_k$ represents the step-size corresponding to the appropriate maneuver. It is set to the smaller of the maximum step-size allowed and the golden ratio $\gamma \approx 0.618$ of the difference between $y_{min}^k$ and $y_{max}^k$, that is, $\Delta y^k = \min\{\Delta y_{max}^k, \gamma(y_{max}^k - y_{min}^k)\}$. The maximum and minimum values are determined according to the logic that, if the passenger provides an opposite response to his previous response, he has reached a limit. Specifically, $$y_{min}^{k+1} = \begin{cases} y^k & \text{if "yes" at } k \text{ and "no" at } k-1, \\ y_{min}^k & \text{otherwise} \end{cases},$$

$$y_{max}^{k+1} = \begin{cases} y^k & \text{if "no" at } k \text{ and "yes" at } k-1, \\ y_{max}^k & \text{otherwise} \end{cases},$$

The response at $k=-1$ is assumed to be null.

In some embodiments, the learning procedure for $p^k$ is as follows. At the beginning of the learning phase, we set $p^0 = p_{max}^k$ and, during Maneuver P, we modify $p^k$ according to the responses from the passenger as follows, $$p^{k+1} = \begin{cases} \max\{p^k - 0.2, 0.2\} & \text{if "no" at } k, \\ p^k & \text{otherwise} \end{cases}.$$

In this way, $p^k$ is always decreasing until it reaches its lower limit. This choice is guided by the assumption that a passenger has a fixed comfort region and that the initial conditions for $a_{max}$, $b_{max}$, $c_{max}$ are well within limits, and these are set from experience by a skilled practitioner in the field. Therefore, at the beginning of the learning phase, a value of $p^0 = p_{max}^k$ will ensure that the region 125 will be within the true comfort region and will only start pushing against boundaries as the simulation progresses. Furthermore, this assumption implies that, once boundaries are reached, $p^k$ can only decrease, which is important for safety considerations.

Various embodiments increase the maximum value of the dominant parameter when the comfort level of the feedback indicates a comfort of the passenger with the value of the dominant parameter and decrease the maximum value of the dominant parameter when the comfort level of the feedback indicates a discomfort of the passenger with the value of the dominant parameter. The value of a step-size of the increase or the decrease of the dominant parameter can vary among different implementations and can be selected by a designer of the system. Additionally or alternatively, in some embodiments, the value of the step-size can vary based on a confidence of dominant parameter estimation.

Figure 8:
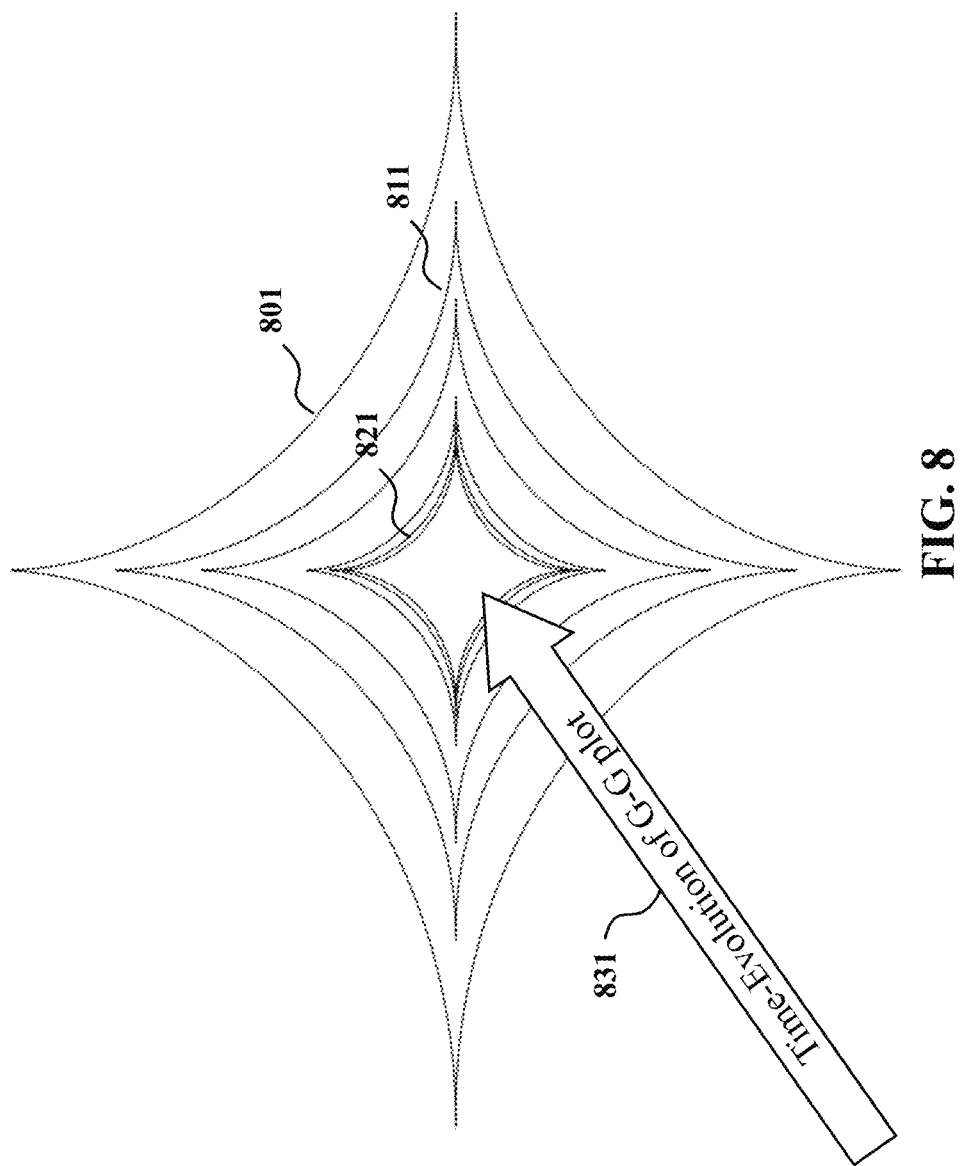
FIG. 8 shows a schematic of varying values of the step-size for updating the g-g plot according to some embodiments.

FIG. 8 shows a schematic of varying values of the step-size for updating the g-g plot according to some embodiments. The embodiments select step-sizes $\Delta \theta^k$ to ensure convergence of $\theta^k$ to the true personalized passenger comfort parameters $\theta$ as the number of iterations become sufficiently large (convergence occurs theoretically after only as k→∞). One such embodiment of the step-size selection is by ensuring that the step-sizes become smaller in magnitude as the number of iterations becomes larger. For example, suppose that as the g-g plot evolves over time 831, it shrinks from a larger envelope 801 to a tighter envelope 821. The shrinkage is more pronounced initially between 801 and 811 than towards later iterations between 811 and 821. One way of choosing the step size is by multiplying with a factor between 0 and 1 after every N iterations, where N is pre-selected by the designer.

Figure 9:
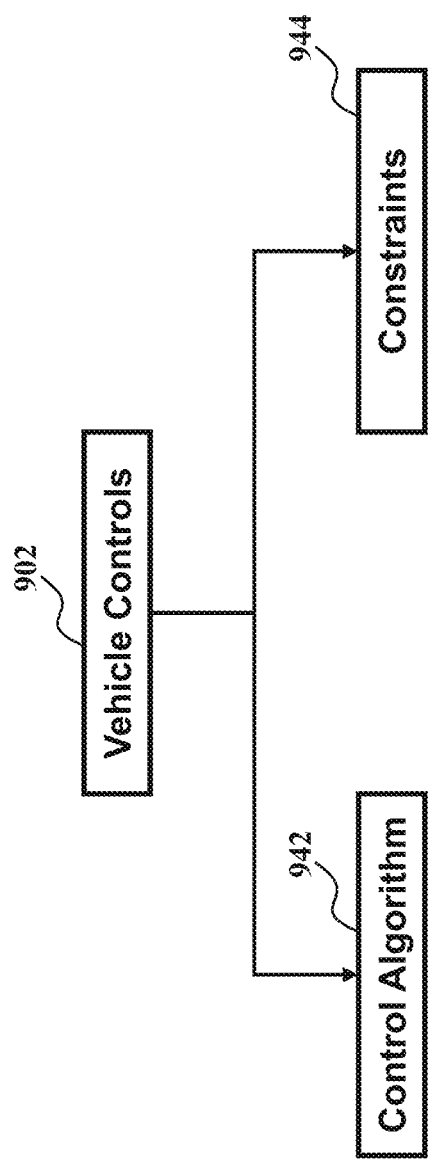
FIG. 9 shows a block diagram of a control of the autonomous vehicle according to some embodiments.

FIG. 9 shows a block diagram of a control of the autonomous vehicle according to some embodiments. The control 902 includes a decision-making component 942 which generates control actions such as wheel angles or steering angles, etc. The computation of control actions may or may not be done simultaneously with enforcing safety and operation constraints 944 such as lane-keeping or limiting acceleration constraints. Some embodiments are based on the realization that one can represent the driver-as-passenger preferences as a constraint 944 to be satisfied by the control algorithm 942.

For longitudinal vehicle control, some embodiments consider the model $m\dot{v}_x = F_x - R_x$ where $v_x$ is the longitudinal vehicle speed, $F_x$ is the force on the vehicle center of mass by the controller and $R_x$ is the sum of all reaction forces. Some embodiments assume that there is no slip in the transmission so that the engine speed $\omega_e$ is equal to the transmission shaft speed $\omega_t$, which is linearly related to the vehicle speed via some inertia $I_e$. For this reason, some embodiments design a proportional controller to track a desired vehicle speed $v_{d,x}$, that is, $\tau_e = K_p(v_x - v_{d,x})$, where $\tau_e$ is the torque acting on the engine. Some embodiments therefore obtain the closed-loop dynamics $\dot{v}_x = -(K_p/mI_e)(v_x - v_{d,x})$. According to these closed-loop dynamics, setting $K_p$ large enough will enable the controller to closely track the desired velocity.

For lateral vehicle control, we consider the single-track error-tracking model for a constant longitudinal speed $v_x$. The error tracking model is given by $$\dot{e} = A_e e + B_\delta \delta = B_\psi \dot{\psi}_d, \quad (1)$$

where $e = [e_y, \dot{e}_y, e_\psi, \dot{e}_\psi]^T$. Here, $e_y$ is the lateral displacement of the vehicle position from the reference path, $e_\psi$ is the difference between actual and desired vehicle yaw angles, $\delta$ is the front wheel angle, and $\dot{\psi}_d$ is the desired vehicle yaw rate. The system matrices are given by $$A_e = \begin{bmatrix} 0 & 1 & 0 & 0 \\ 0 & -\frac{2C_0}{mv_x} & \frac{2C_0}{m} & -\frac{2C_1}{mv_x} \\ 0 & 0 & 0 & 1 \\ 0 & -\frac{2C_1}{I_z v_x} & \frac{2C_1}{I_z} & -\frac{2C_2}{I_z v_x} \end{bmatrix}, B_\delta = \begin{bmatrix} 0 \\ \frac{2C_{\alpha,f}}{m} \\ 0 \\ \frac{2\ell_f C_{\alpha,f}}{I_z} \end{bmatrix},$$

$$B_\psi = \begin{bmatrix} 0 \\ -\frac{2C_1}{mv_x} - v_x \\ 0 \\ -\frac{2C_2}{I_z v_x} \end{bmatrix}$$

with coefficients $C_0 = C_{\alpha,f} + C_{\alpha,r}$, $C_1 = l_f C_{\alpha,f} + l_r C_{\alpha,r}$, $C_2 = l_f^2 C_{\alpha,f} + l_r^2 C_{\alpha,r}$.

Other relevant system parameters include the longitudinal vehicle speed $v_x$, the vehicle mass m, the moment of inertia about the vertical $I_z$, the front and rear tire stiffness $C_{\alpha,f/r}$, and the distance from the vehicle $l_f$, $l_r$ for the front and rear axles, respectively. Some embodiments assume that the desired yaw rate $\dot{\psi}_d = 0$. Some embodiments design a gain-scheduled controller for the system (1) for regulating the desired longitudinal speed $v_{d,x}$. Specifically, some embodiments design a set of state-feedback gains $K_{v_x}$ for $v_x$ in a set of velocities $V_x$. For example, $V_x = \{5, 10, \ldots, 150\}$ km/hr. The road wheel angle is set to, $\delta = -K_{v_{dx}} e$, where $K_{v_{dx}}$ is the interpolated value between the nearest gains $K_{v_x}$ corresponding to the desired vehicle velocity. One example of the interpolation is linear interpolation.

Exemplar Implementations

An autonomous vehicle includes at least one autonomous driving sensor configured to monitor at least one condition while the vehicle is operating in an autonomous mode. A processing device is configured to control at least one vehicle subsystem while the vehicle is operating in the autonomous mode. The processing device is configured to control at least one vehicle subsystem according to a passenger preference. The driver-as-passenger preference may be learned while the vehicle is operating in autonomous mode using on-line labeling. The system shown in the FIGS. 10A-10D may take many different forms and include multiple and/or alternate components and facilities. While an exemplar system is shown, the exemplar components illustrated are not intended to be limiting. Indeed, additional or alternative components and/or implementations may be used.

Figure 10A:
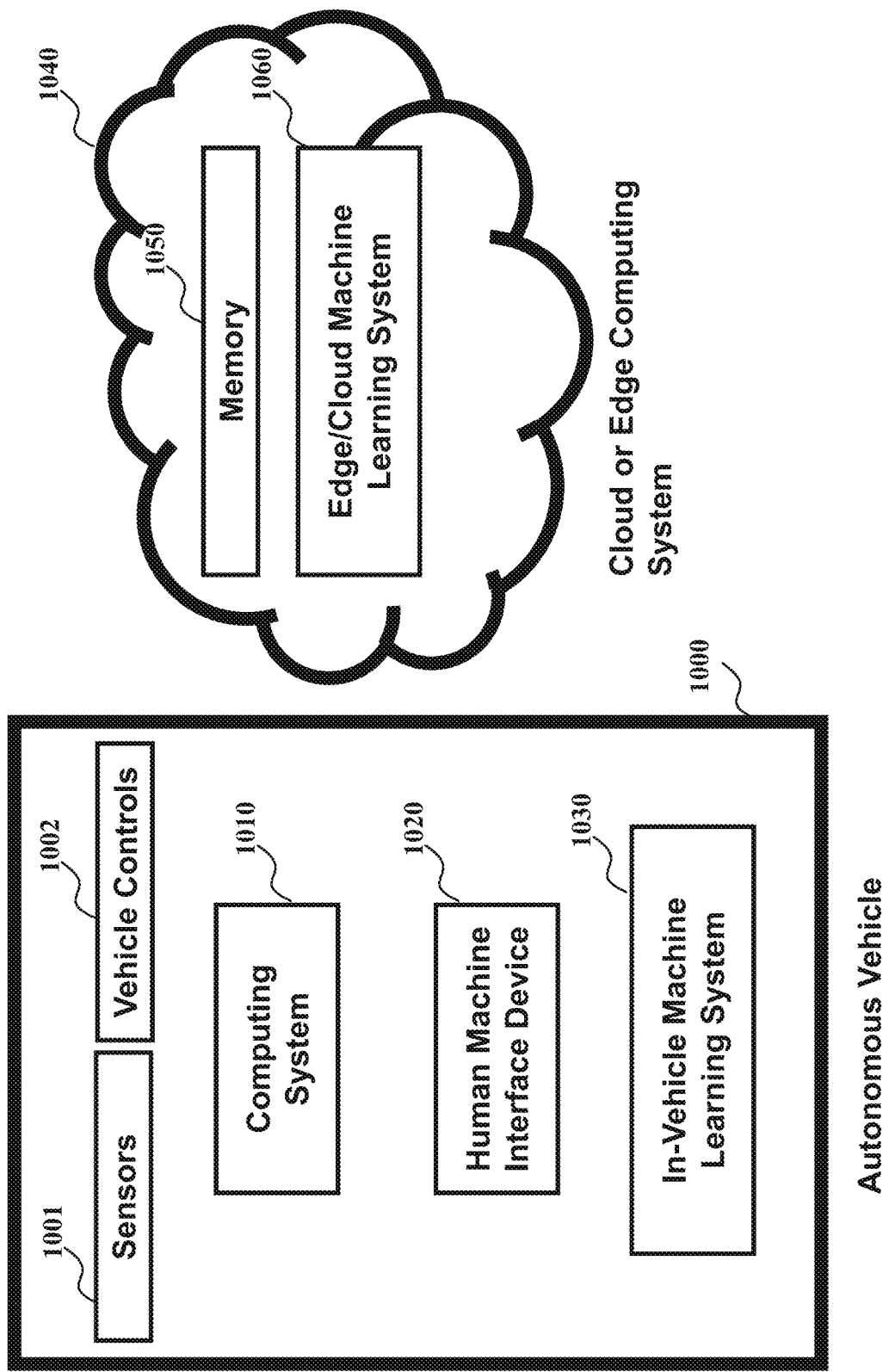
FIG. 10A a pictorial representation of the various components in a control system of an autonomous vehicle, and a cloud platform or edge platform associated with the autonomous vehicle, according to example aspects of the present disclosure.

An exemplar components of autonomous vehicle 1000 is shown in FIG. 10A. The autonomous driving sensors 1001 may include any number of devices configured to generate signals that assist the vehicle controls 1002 to help navigate the vehicle in autonomous mode. Examples of autonomous driving sensors 1001 may include a radar sensor, a lidar sensor, a camera, an ultrasonic sensor, an energy harvesting sensor, or the like. In some possible approaches, the autonomous driving sensors 1001 may be configured to receive information from a remote source such as cloud-based sensors like a dedicated short range communication (DSRC) compliant device (802.11p), a cellular receiver, a WiFi receiver, or the like.

The vehicle control subsystem 1002 may control the autonomous vehicles based, at least in part, on signals generated by the autonomous driving sensors 1001. While the vehicle is operating in the autonomous mode, the vehicle control subsystem 1002 may be configured to control the vehicle according to one or more driver-as-passenger preferences. For example, the vehicle control subsystem 1002 may, while the vehicle is operating in the non-autonomous mode, learn various driver-as-passenger preferences, associate the learned preferences to predetermined scenarios, and apply the learned driver-as-passenger preference when the predetermined scenario occurs while the vehicle is operating in the autonomous mode. If no driver-as-passenger preference is associated with a particular predetermined scenario, the vehicle control subsystem 1002 may be configured to apply a default profile control for that scenario until a preference is learned in-vehicle by the learning system 1030 or informed remotely by the learning system 1060. Examples of scenarios may include various combinations of roadway conditions, environmental conditions, and/or traffic conditions.

In some embodiments, the vehicle control 1002 may be configured to associate each learned driver-as-passenger preference to one or more profile controls, such as a longitudinal profile control and/or a lateral profile control. The longitudinal profile control may define how the vehicle operates in the autonomous mode when traveling longitudinally (e.g., in forward or reverse directions). The longitudinal profile control may include a speed profile control, a deceleration profile control, and an acceleration profile control. The speed profile control may define the speed of the vehicle, when operating in the autonomous mode, relative to a posted speed limit. The deceleration profile control may define how quickly the vehicle decelerates when the vehicle is operating in the autonomous mode, and the acceleration profile control may define how quickly the vehicle accelerates when operating in the autonomous mode. The lateral profile control may define how the vehicle changes direction (e.g., turns and/or veers left or right) when operating in the autonomous mode. The lateral profile control may include, e.g., a steering profile control. The steering profile may define a driver-as-passenger preference for a steering wheel angle and rate of change during turns.

Other components of the present disclosure include a human machine interface system 1020 for collecting driver-as-passenger preference information from a human user for various purposes, including the provision of labels for machine learning, and/or for loading previously stored preferences, etc. An in-vehicle learning system 1030 is present for the purposes of learning the driver-as-passenger preferences, and/or for updating prior preferences, etc. In such cases e.g. that computations of the learning system is too prohibitive to be done in-vehicle, there may be, according to some embodiments, a peripheral edge/cloud computing platform 1040 for various purposes including the storage of data in the memory 1050, or the performing of complex computations required by advanced machine learning algorithms in the edge/cloud machine learning system 1060.

Figure 10B:
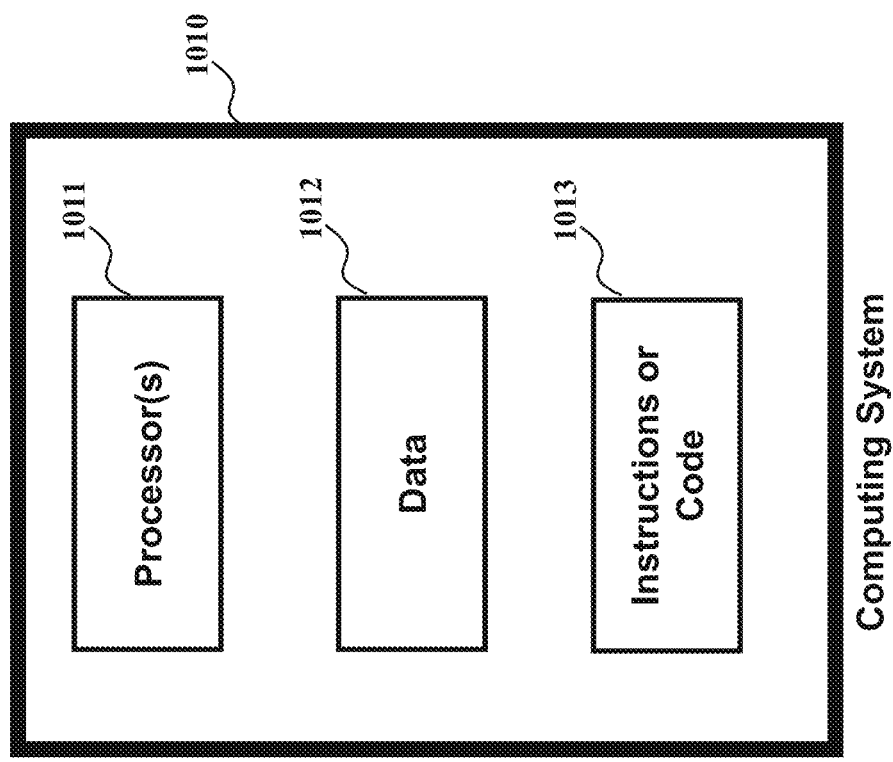
FIG. 10B is a schematic block diagram of the components of a computing system within an autonomous vehicle, according to various embodiments of the present disclosure.

In general, the processor 1011 of the computing system 1010 as depicted in FIG. 10B may employ any number of computer operating systems, including, but by no means limited to, versions and/or varieties of the the Microsoft Windows operating system, the Unix operating system, the AIX UNIX operating system, the Linux operating system, the MacOSX and iOS operating systems, and the Android operating system. Examples of computing devices include, without limitation, a computer work station, a server, a desktop, note book, laptop, or handheld computer, or some other computing system and/or device residing in an edge or cloud platform 1040.

Computing devices generally include computer-executable instructions 1013, where the instructions may be executable by one or more computing devices such as those listed above. Computer-executable instructions 1013 may be compiled or interpreted from computer programs created using a variety of programming languages and/or technologies, including, without limitation, and either alone or in combination, Java™, C, C++, VisualBasic, MATLAB, Python, JavaScript, etc. In general, a processor (e.g., a microprocessor) receives instructions, e.g., from a memory, a computer-readable medium, etc., and executes the instructions 1013, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data 1012 that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, pen drives, any other physical medium with patterns of holes, a RAM, a PROM, an EPROM, a FLASH-EEPROM, any other memory chip or cartridge, or any other medium from which a computer can read data or instructions.

Figure 10C:
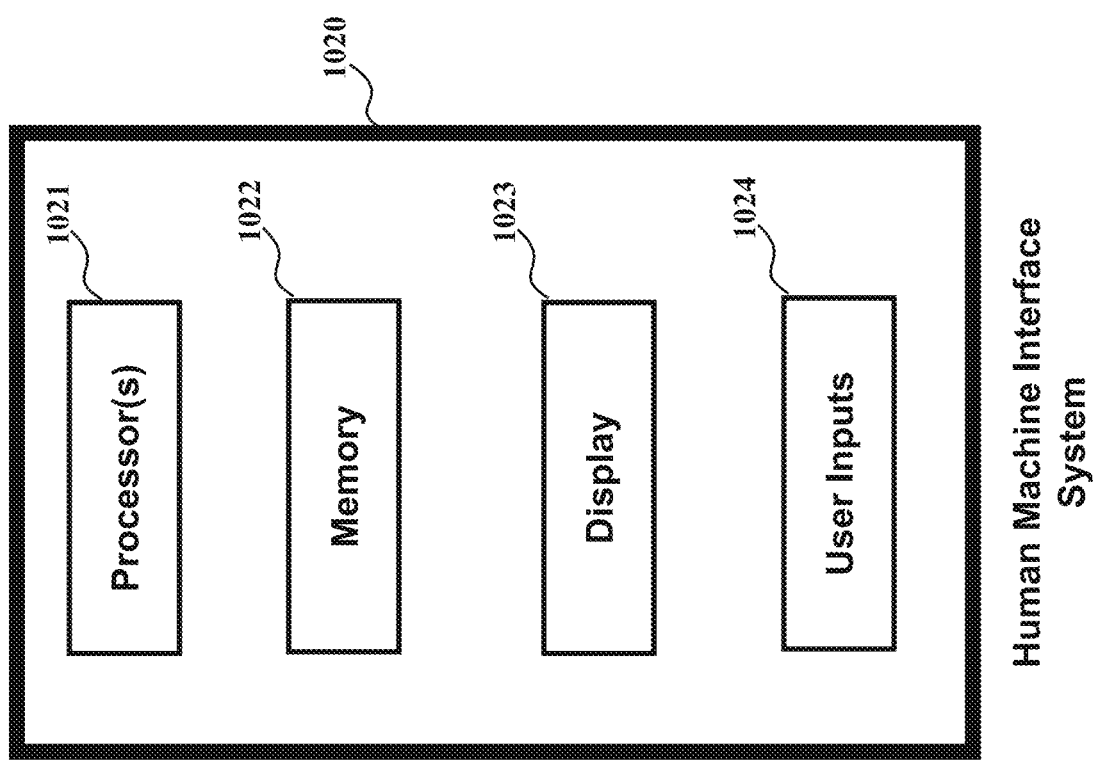
FIG. 10C is a schematic block diagram of the components of a human to machine interfacing system within an autonomous vehicle, according to various embodiments of the present disclosure.

FIG. 10C describes the human machine interface system 1020 in more detail. The human machine interface system or device 1020 can enable communication, control, and/or other interface actions to occur between the autonomous vehicle and a human (e.g., a passenger located within the autonomous vehicle). The human machine interface device 1020 can be communicatively coupled to the vehicle computing system to enable exchange of data, instructions, and/or requests between the system and the device, such as via user inputs 1024. The human machine interface device can include or be implemented by one or more processing units 1021 that are operatively connected. The human machine interface device can be an embedded processors or a stand-alone computing device. In one particular example, the human machine interface device can be a tablet computing device that is positioned within the autonomous vehicle (e.g., within a rear seat area of the autonomous vehicle).

The human machine interface device can include one or more processors 1021 and a memory 1022. The one or more processors 1021 can be any suitable processing device (e.g., a processor core, a microprocessor, an ASIC, a FPGA, a controller, a microcontroller, etc.) and can be one processor or a plurality of processors that are operatively connected. The memory 1022 can include one or more non-transitory computer-readable storage media, such as RAM, ROM, EEPROM, EPROM, one or more memory devices, flash memory devices, etc., and combinations thereof.

The human machine interface device can facilitate the prompting, collection, and/or entry of autonomous vehicle passenger input data. In particular, the human machine interface device can utilize one or more interactive users interfaces such as a display 1023 to enable passengers to enter passenger input data descriptive of a passenger experience. In particular, according to an aspect of the present disclosure, the human machine interface device and/or the vehicle computing system can prompt the passenger to provide user inputs 1024 regarding their subjective response to one or more events during an autonomous vehicle driving session. In such fashion, user inputs 1024 and/or feedbacks regarding specific instances and/or types of driving maneuvers can be collected, enabling more advanced and granular understanding and refinement of the autonomous vehicle technology relative to particular types of driving events and/or particular physical locations.

In some implementations, the human machine interface device can include a display device 1023 (e.g., a touch-sensitive display device) and/or other input/output components that provide an interactive user interface (e.g., through which the passenger can provide passenger feedback). For example, the display device can be a rear-seat display device that is accessible by a passenger that is located in a rear seat of the autonomous vehicle. In some implementations, in addition or alternatively to the human machine interface device, the systems and methods of the present disclosure can include or leverage a user computing device that is associated with the driver-as-passenger. For example, in some implementations, in addition or alternatively to the display 1023 of the user interface by the human machine interface device 1020, the interactive user interface can be provided on or accessible via a display of the user computing device. The user computing device can be communicatively connected to the human machine interface device via a local area network such as a short range wireless connection (e.g., a Bluetooth, ZigBee, NFC, infrared, etc.) or other forms of connections (e.g., hardwiring). As examples, the user computing device can be a smartphone, tablet computing device, wearable computing device, portable gaining device, handheld display screen, or other forms of computing devices. In some implementations, the user computing device can be connected to the computing system via the network. The user interface can be displayed on a display portion of the human machine interface device (e.g., a seat display, handheld display, etc.), on a display of the user computing devices, or in other manners or locations. The interactive user interface can enable a passenger of the autonomous vehicle to enter passenger feedback (i.e., passenger input data) regarding the passenger's experience during an autonomous vehicle driving session. For example, a touch-sensitive display can receive passenger feedback via touch. Other input components can be used as well such as, for example, a mouse, a keyboard or keypad, a touch pad, a click wheel, keyboard, ball, etc.

In some embodiments, the user interface is not displayed on a display device (e.g., display), but instead may be, for example, audio-based. For example, a speaker included in the human machine interface device or other system component may prompt the user to provide a voice response that includes passenger feedback regarding an event during an autonomous vehicle driving session. For example, a personal assistant or other artificial intelligence based technology can interact with the passenger via voice conversation to obtain feedback. As another example, the user interface can be embodied in one or more physical buttons, knobs, sliders, levers, or other user input components which enable a user to provide passenger feedback through manipulation of such physical components. As yet another example, passenger feedback can be obtained through analysis of imagery captured by a camera. For example, computer vision techniques can be applied to imagery to assess or identify gestures, speech, eye movement, and/or facial expressions indicative of passenger comfort and/or satisfaction (e.g., thumbs up versus thumbs down).

Figure 10D:
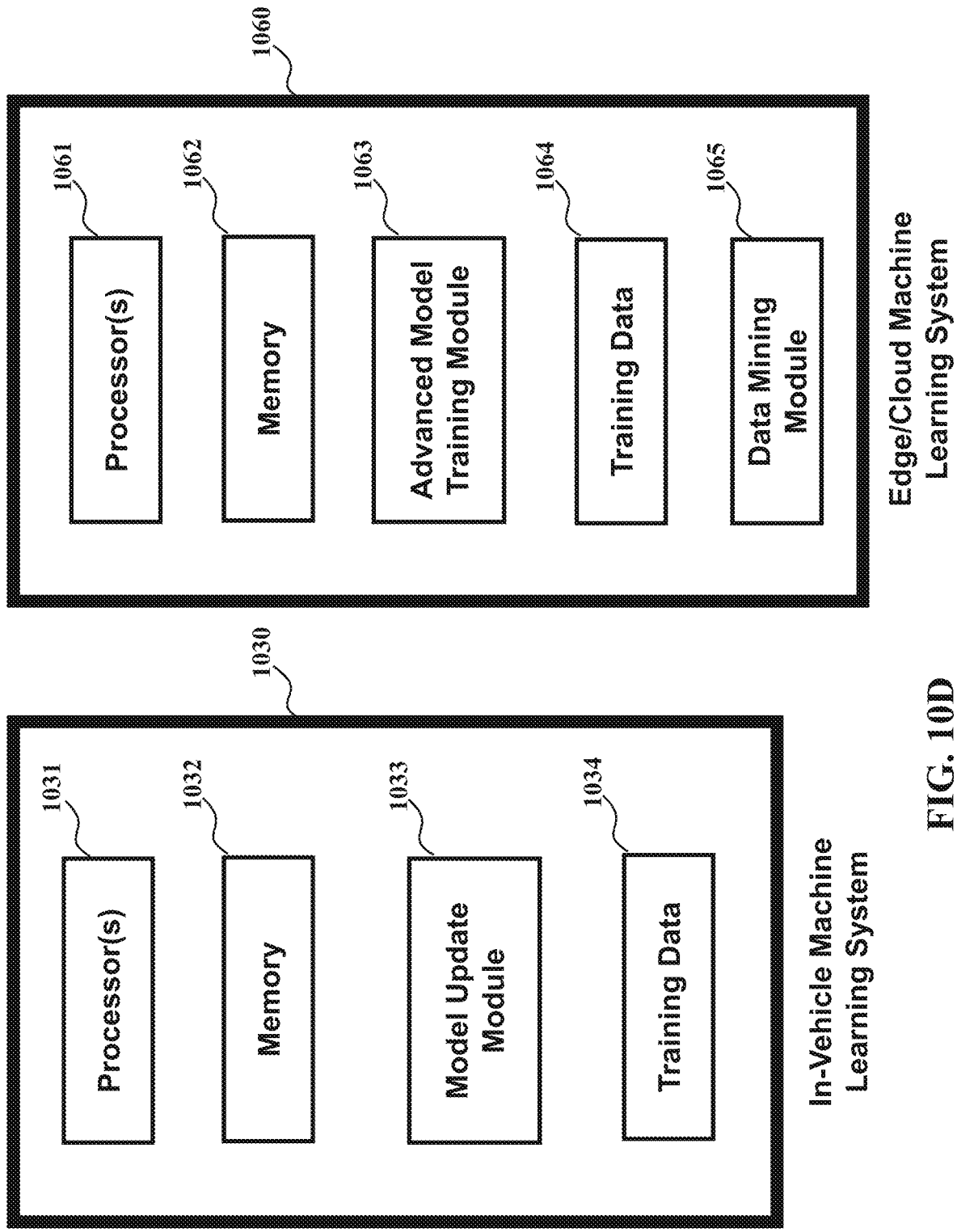
FIG. 10D is a schematic block diagram of the components of a machine learning system within an autonomous vehicle and in a cloud/edge platform associated with the autonomous vehicle, according to various embodiments of the present disclosure.

FIG. 10D describes the machine learning system either in-vehicle 1030, on a remote platform 1060, or a combination of both. As examples, the machine learned model can be, or include one or more of: a random forest classifier; a logistic regression classifier; a support vector machine; one or more decision trees; a neural network; a k-nearest neighbors model; and/or other types of models including both linear models and non-linear models. Neural networks can include deep neural networks, feed-forward neural networks, recurrent neural networks (e.g., LSTM networks), convolutional neural networks, and combinations thereof. In some implementations, the model can include certain parameters, such as one or more limits or thresholds. For example, in some implementations, a human, such as an engineer, can define certain limits or thresholds within the model. For example, an engineer can set a maximum acceleration rate, a maximum velocity, a maximum stop duration, or other parameter, which can be incorporated into the model. In some implementations, the model can determine the adjusted vehicle parameter such that the adjusted vehicle parameter is within such parameters, limits, and/or thresholds. These machine learning models leverage training data 1034 obtained during maneuvers made by the autonomous vehicle, and labels given to the maneuvers based on user inputs 1024. In-vehicle training or machine learning adjustment and update operations are performed using the model update module 1033 whose primary compute capabilities are run on an in-vehicle processor 1031.

In some implementations, certain operations described herein can be performed by an advanced machine learning computing system 1063 that is remotely located to the autonomous vehicle and in communication with the autonomous vehicle over one or more wireless networks (e.g., cellular data networks, satellite communication networks, wide area networks, etc.). As an example, the machine learning computing system can use training data 1064 included in one or more server computing devices. In the event that plural server computing devices are used, the server processors 1061 can be arranged according to a parallel computing architecture, a sequential computing architecture, or combinations thereof. In some implementations, the machine learning computing system can provide control, monitoring, management, and/or other functionality such as data mining 1065 from a fleet of autonomous vehicles. For example, in some implementations, the machine learning computing system 1060 can determine an adjusted vehicle parameter for a plurality of autonomous vehicles, and can provide the adjusted vehicle plurality to the fleet of autonomous vehicles via the network.

In some implementations, the vehicle computing system can adjust one or more vehicle parameters as described herein. In some implementations, the vehicle computing system can be on-board an autonomous vehicle. In other implementations, the machine learning computing system or other computing system not on board the autonomous vehicle can adjust a vehicle parameter, and provide the adjusted vehicle parameter to the autonomous vehicle. The vehicle computing system can include one or more distinct physical computing devices.

The memory 1032/1062 associated with the machine learning system contains information relevant to identification of driver-as-passenger profiles. This includes, but is not limited to, parameters of the learning algorithm, biometric identification data of the driver-as-passenger, relevant target and feature sets required for learning, etc. Such information is stored in general in memory 1050 databases, data repositories or other data storage media described here. These include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats.

Figure 11:
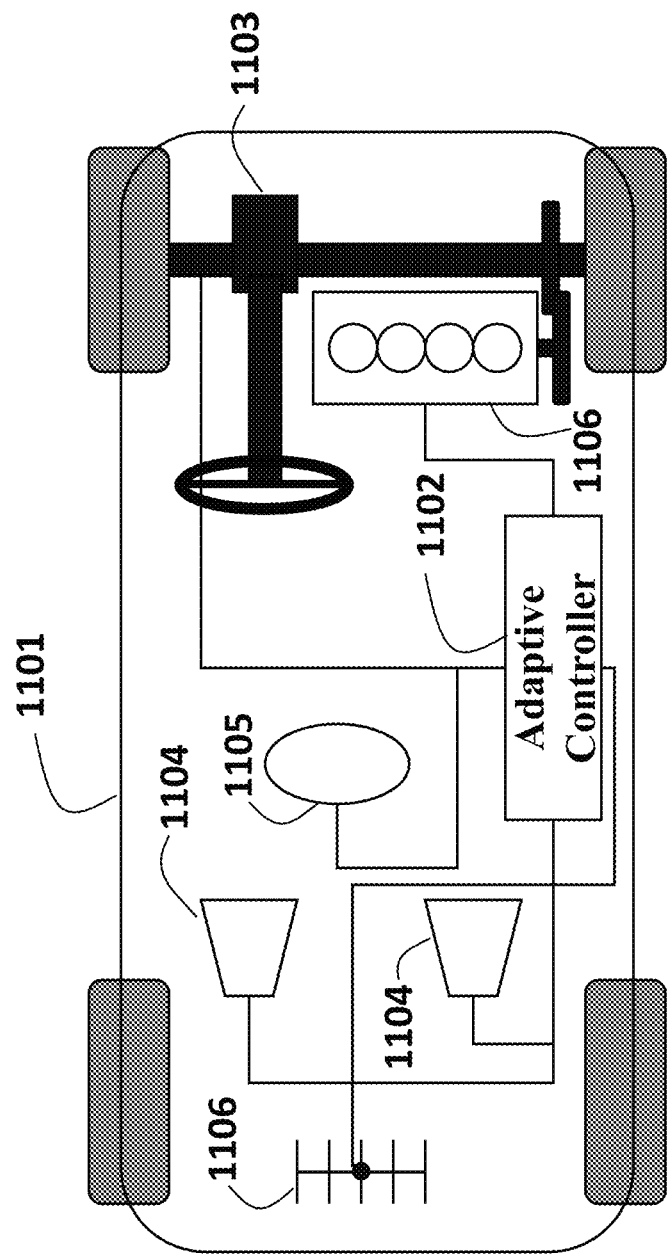
FIG. 11 shows a schematic of a vehicle including an adaptive controller employing principles of some embodiments.

FIG. 11 shows a schematic of a vehicle 1101 including a adaptive controller 1102 employing principles of some embodiments. As used herein, the vehicle 1101 can be any type of wheeled vehicle, such as a passenger car, bus, or rover. Also, the vehicle 1101 can be an autonomous or semi-autonomous vehicle. For example, some embodiments control the motion of the vehicle 1101. Examples of the motion include lateral motion of the vehicle controlled by a steering system 1103 of the vehicle 1101. In one embodiment, the steering system 1103 is controlled by the controller 1102. Additionally or alternatively, the steering system 1103 can be controlled by a driver of the vehicle 1101.

The vehicle can also include an engine 1106, which can be controlled by the controller 1102 or by other components of the vehicle 1101. The vehicle can also include one or more sensors 1104 to sense the surrounding environment. Examples of the sensors 1104 include distance range finders, radars, lidars, and cameras. The vehicle 1101 can also include one or more sensors 1105 to sense its current motion quantities and internal status. Examples of the sensors 1105 include global positioning system (GPS), accelerometers, inertial measurement units, gyroscopes, shaft rotational sensors, torque sensors, deflection sensors, pressure sensor, and flow sensors. The sensors provide information to the controller 1102. The vehicle can be equipped with a transceiver 1106 enabling communication capabilities of the controller 1102 through wired or wireless communication channels.

Figure 12:
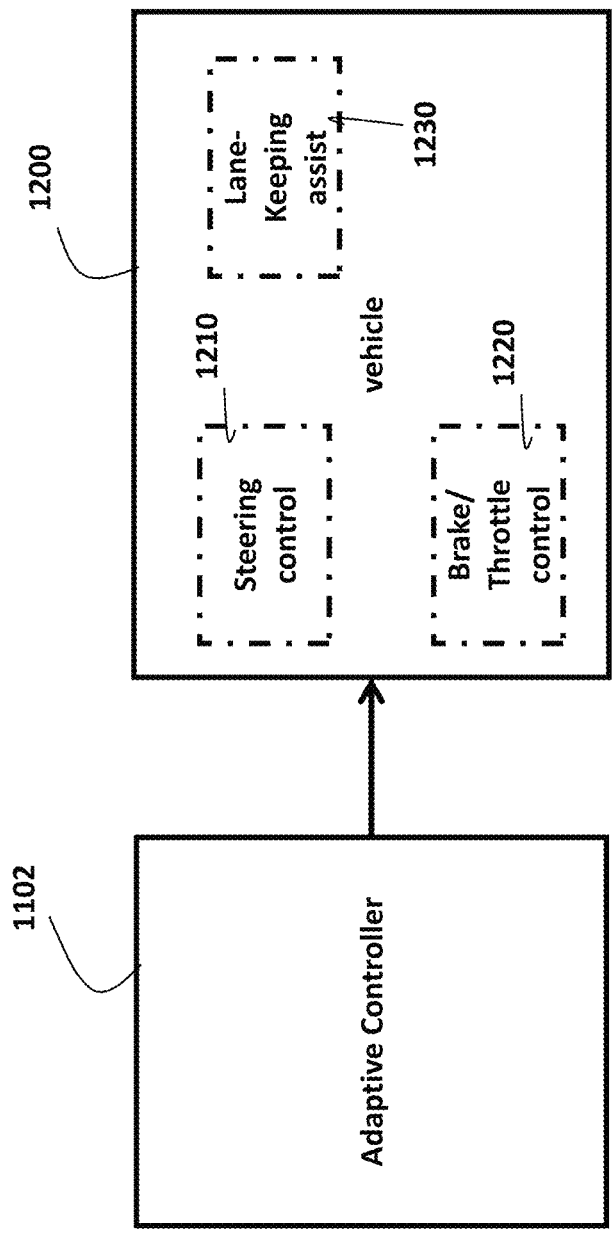
FIG. 12 shows a schematic of interaction between the adaptive controller and other controllers of the vehicle according to some embodiments.

FIG. 12 shows a schematic of interaction between the adaptive controller 1102 and the controllers 1200 of the vehicle 1101 according to some embodiments. For example, in some embodiments, the controllers 1200 of the vehicle 1101 are steering 1210 and brake/throttle controllers 1220 that control rotation and acceleration of the vehicle 1200. In such a case, the adaptive controller 1102 outputs control inputs to the controllers 1210 and 1220 to control the state of the vehicle. The controllers 1200 can also include high-level controllers, e.g., a lane-keeping assist controller 1230 that further process the control inputs of the predictive controller 1102. In both cases, the controllers 1200 maps use the outputs of the predictive controller 1102 to control at least one actuator of the vehicle, such as the steering wheel and/or the brakes of the vehicle, in order to control the motion of the vehicle.

The above-described embodiments of the present invention can be implemented in any one of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A system for controlling a vehicle, comprising:
a memory configured to store parameters of a g-g plot defining admissible space of values of longitudinal and lateral accelerations, wherein the parameters of the g-g plot include a maximum forward acceleration, a maximum backward acceleration, a maximum lateral acceleration and a shape parameter defining profile of curves connecting maximum values of forward, backward, and lateral accelerations;
an input interface configured to accept a comfort level as a feedback from a passenger of the vehicle;
a processor configured to:
determine, from among the parameters of the g-g plot, a dominant parameter of the g-g plot corresponding to the feedback, based on proximity of a value of the dominant parameter of the g-g plot to its maximum value; and
update the determined dominant parameter of the g-g plot, based on the comfort level indicated in the feedback; and
a controller configured to control the vehicle to maintain dynamics of the vehicle within an admissible space defined by parameters of the g-g plot with the updated dominant parameter.

2. The system of claim 1, wherein the processor is configured to select one of:
the forward acceleration as the dominant parameter when value of the forward acceleration is the closest to its maximum value among the parameters of the g-g plot and a distance between the value of the forward acceleration and its maximum value is within a predefined range,
the backward acceleration as the dominant parameter when value of the backward acceleration is the closest to its maximum value among the parameters of the g-g plot and a distance between the value of the backward acceleration and its maximum value is within the predefined range,
the lateral acceleration as the dominant parameter when the value of the lateral acceleration is the closest to its maximum value among the parameters of the g-g plot and a distance between the value of the lateral acceleration and its maximum value is within the predefined range, or
the shape parameter as the dominant parameter.

3. The system of claim 1, wherein the processor is configured to
request the controller to control the vehicle to move in a predetermined manner to make one of the parameters of the g-g plot dominant;
request the passenger to provide the feedback on the movement of the vehicle in the predetermined manner; and
update the dominant parameter of the g-g plot that is associated with the movement in the predetermined manner based on the feedback.

4. The system of claim 3,
wherein the processor is configured to request the controller to move the vehicle straight with a value of the forward acceleration above the maximum forward acceleration to make the forward acceleration dominant;
wherein the processor is configured to request the controller to move the vehicle straight with a value of the backward acceleration above the maximum backward acceleration to make the backward acceleration dominant;
wherein the processor is configured to request the controller to move through a curve with a value of the lateral acceleration above the maximum lateral acceleration to make the lateral acceleration dominant; or
wherein the processor is configured to request the controller to move through the curve with a value of the lateral acceleration and a value of forward acceleration tracking a profile of the g-g plot to make the lateral acceleration dominant.

5. The system of claim 1, wherein the processor is configured to increase a maximum value of the dominant parameter when the comfort level of the feedback indicates a comfort of the passenger with a value of the dominant parameter, and wherein the processor is configured to decrease the maximum value of the dominant parameter when the comfort level of the feedback indicates a discomfort of the passenger with the value of the dominant parameter.

6. The system of claim 5, wherein to obtain the updated g-g plot, the processor is configured to increase or decrease the dominant parameter of the g-g plot, based on a predetermined value of a step-size.

7. The system of claim 6, wherein the value of the step-size varies based on a number of iterations updating the dominant parameter of the g-g plot.

8. A method for controlling a vehicle, wherein the method uses a processor coupled with stored instructions implementing the method, wherein the instructions, when executed by the processor carry out at steps of the method, comprising:
accepting a comfort level as a feedback from a passenger of the vehicle;
determining, from among parameters of a g-g plot, a dominant parameter of the g-g plot corresponding to the feedback, based on proximity of a value of the dominant parameter of the g-g plot to its maximum value, wherein the g-g plot defines admissible space of values of longitudinal and lateral accelerations, wherein the parameters of the g-g plot include a maximum forward acceleration, a maximum backward acceleration, a maximum lateral acceleration and a shape parameter defining profile of curves connecting maximum values of forward, backward, and lateral accelerations;
updating the dominant parameter of the g-g plot, based on the comfort level indicated in the feedback; and
controlling the vehicle to maintain dynamics of the vehicle within an admissible space defined by parameters of the g-g plot with the updated dominant parameter.

9. The method of claim 8, further comprising selecting one of:
the forward acceleration as the dominant parameter when value of the forward acceleration is the closest to its maximum value among the parameters of the g-g plot and a distance between the value of the forward acceleration and its maximum value is within a predefined range;
the backward acceleration as the dominant parameter when value of the backward acceleration is the closest to its maximum value among the parameters of the g-g plot and a distance between the value of the backward acceleration and its maximum value is within the predefined range;
the lateral acceleration as the dominant parameter when the value of the lateral acceleration is the closest to its maximum value among the parameters of the g-g plot and a distance between the value of the lateral acceleration and its maximum value is within the predefined range; or
the shape parameter as the dominant parameter.

10. The method of claim 8, further comprising:
requesting the controller to control the vehicle to move in a predetermined manner to make one of the parameters of the g-g plot dominant;
requesting the passenger to provide the feedback on the movement of the vehicle in the predetermined manner; and
updating the dominant parameter of the g-g plot that is associated with the movement in the predetermined manner based on the feedback.

11. The method of claim 10, further comprising:
requesting to move the vehicle straight with a value of the forward acceleration above the maximum forward acceleration to make the forward acceleration dominant;
requesting to move the vehicle straight with a value of the backward acceleration above the maximum backward acceleration to make the backward acceleration dominant;
requesting to move through a curve with a value of the lateral acceleration above the maximum lateral acceleration to make the lateral acceleration dominant; or
requesting to move through the curve with a value of the lateral acceleration and a value of forward acceleration tracking a profile of the g-g plot to make the lateral acceleration dominant.

12. The method of claim 8, further comprising:
increasing the maximum value of the dominant parameter when the comfort level of the feedback indicates a comfort of the passenger with a value of the dominant parameter; and
decreasing the maximum value of the dominant parameter when the comfort level of the feedback indicates a discomfort of the passenger with the value of the dominant parameter.

13. A non-transitory computer readable storage medium embodied thereon a program executable by a processor for performing a method, the method comprising:
accepting a comfort level as a feedback from a passenger of a vehicle;
determining, from among parameters of a g-g plot, a dominant parameter of the g-g plot corresponding to the feedback, based on proximity of a value of the dominant parameter of the g-g plot to its maximum value, wherein the g-g plot defines admissible space of values of longitudinal and lateral accelerations, wherein the parameters of the g-g plot include a maximum forward acceleration, a maximum backward acceleration, a maximum lateral acceleration and a shape parameter defining profile of curves connecting maximum values of forward, backward, and lateral accelerations;

updating the dominant parameter of the g-g plot, based on the comfort level indicated in the feedback; and controlling the vehicle to maintain dynamics of the vehicle within an admissible space defined by parameters of the g-g plot with the updated parameter.

\* \* \* \* \*